(12) United States Patent
Jeong et al.

(10) Patent No.: US 10,031,533 B2
(45) Date of Patent: Jul. 24, 2018

(54) DRINKING WATER SUPPLY DEVICE

(71) Applicant: LG ELECTRONICS INC., Seoul (KR)

(72) Inventors: Changhun Jeong, Seoul (KR); Youngjin Kim, Seoul (KR); Sangduck Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 14/963,353

(22) Filed: Dec. 9, 2015

(65) Prior Publication Data

US 2016/0168828 A1 Jun. 16, 2016

(30) Foreign Application Priority Data

Dec. 11, 2014 (KR) .................. 10-2014-0178357
Jan. 27, 2015 (KR) .................. 10-2015-0012622

(51) Int. Cl.
*E03B 7/07* (2006.01)
*G05D 16/20* (2006.01)
(Continued)

(52) U.S. Cl.
CPC ......... *G05D 16/2066* (2013.01); *B67D 1/004* (2013.01); *B67D 1/0014* (2013.01);
(Continued)

(58) Field of Classification Search
CPC .. B67D 1/004; B67D 1/0014; G05D 16/2066; G05D 11/132; B57D 2210/0001; B57D 2210/00049
See application file for complete search history.

(56) References Cited

U.S. PATENT DOCUMENTS 3,375,913 A * 4/1968 Norris, Jr. ............... G07F 13/00
194/240
3,442,800 A 5/1969 Jasionowski
(Continued)

FOREIGN PATENT DOCUMENTS

CN 1201925 12/1998
CN 1357489 7/2002
(Continued)

OTHER PUBLICATIONS

English Translation for JPH06182360 published Jul. 1994.*
(Continued)

*Primary Examiner* — Anthony Weier
(74) *Attorney, Agent, or Firm* — KED & Associates, LLP

(57) ABSTRACT

A drinking water supply device may include a first channel configured to channel water, the first channel provided with a first valve, a flow rate sensor configured to sense a flow rate of the water, a water discharge channel connected to the rear end of the first channel, a connection pipe connecting the first channel and the water discharge channel, a second channel configured to supply minerals to the connection pipe, the second channel provided with a pressure sensor and a second valve, a mineral container configured to connect to the connection pipe via the second channel and configured to store condensed minerals, a pump configured to pressurize an interior of the mineral container to allow discharge of the condensed minerals from the mineral container, and a controller configured to control the flow rate sensor, the pressure sensor, and the first valve.

11 Claims, 11 Drawing Sheets

(51) Int. Cl.
    *G05D 7/06*     (2006.01)
    *B67D 1/00*     (2006.01)
    *G05D 11/13*     (2006.01)

(52) U.S. Cl.
    CPC .... *G05D 11/132* (2013.01); *B67D 2210/0001* (2013.01); *B67D 2210/00049* (2013.01)

(56) References Cited

U.S. PATENT DOCUMENTS

| | | | |
|---|---|---|---|
| 3,785,492 A | 1/1974 | Mazza | |
| 5,427,682 A * | 6/1995 | Vogel | B01D 61/08 210/257.2 |
| 5,443,739 A * | 8/1995 | Vogel | B01D 61/08 210/257.2 |
| 8,515,574 B2 | 8/2013 | Studor et al. | |
| 8,893,927 B2 | 11/2014 | Olson et al. | |
| 2003/0234212 A1 | 12/2003 | Ito et al. | |
| 2006/0070936 A1* | 4/2006 | Kato | C02F 1/688 210/192 |
| 2007/0199582 A1* | 8/2007 | Kroon | B67D 1/0009 134/56 R |
| 2012/0055857 A1* | 3/2012 | Marin | C02F 1/004 210/97 |
| 2012/0285897 A1* | 11/2012 | Fike | C02F 9/00 210/743 |
| 2015/0059807 A1 | 3/2015 | Behle et al. | |

FOREIGN PATENT DOCUMENTS

| | | |
|---|---|---|
| CN | 101007661 | 8/2007 |
| CN | 101193825 | 6/2008 |
| CN | 201280452 | 7/2009 |
| CN | 102107941 | 6/2011 |
| CN | 102307639 | 1/2012 |
| CN | 102961050 | 3/2013 |
| CN | 203279755 | 11/2013 |
| CN | 103596473 | 2/2014 |
| CN | 103844897 | 6/2014 |
| CN | 103960983 | 8/2014 |
| JP | H06-10198 | 2/1994 |
| JP | H06182360 * | 7/1994 |
| JP | 08071571 * | 3/1996 |
| JP | 11244895 * | 9/1999 |
| JP | 2000-254664 | 9/2000 |
| JP | 2000-357269 A | 12/2000 |
| JP | 2006-198555 | 8/2006 |
| JP | 2007-229293 | 9/2007 |
| JP | 2008-239166 | 10/2008 |
| JP | 2011-522568 | 8/2011 |
| JP | 50-34592 | 9/2012 |
| JP | 2015-500206 | 1/2015 |
| KR | 10-0032724 | 3/1986 |
| KR | 20-0197709 | 9/2000 |
| KR | 20-0396242 | 9/2005 |
| KR | 10-0727676 | 6/2007 |
| KR | 10-0890213 | 3/2009 |

OTHER PUBLICATIONS

U.S. Appl. No. 14/963,327, filed Dec. 9, 2015.
U.S. Appl. No. 14/963,418, filed Dec. 9, 2015.
Chinese Office Action (with English Translation) dated Dec. 19, 2017 issued in Application No. 201510919930.1.
Chinese Office Action (with English Translation) dated Jan. 17, 2018 issued in Application No. 201510920076.0.
U.S. Office Action dated Jan. 25, 2018 issued in co-pending U.S. Appl. No. 14/963,418.
U.S. Office Action dated Mar. 8, 2018 issued in co-pending U.S. Appl. No. 14/963,327.
Chinese Office Action (with English Translation) dated Feb. 23, 2018 issued in Application No. 201510919830.9.

* cited by examiner

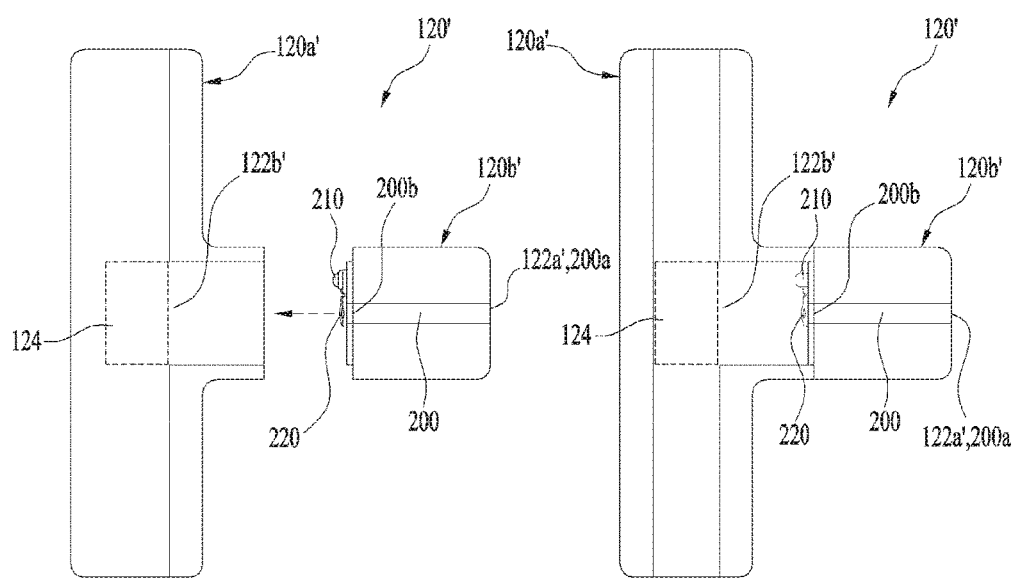

DRINKING WATER SUPPLY DEVICE

CROSS-REFERENCE TO RELATED APPLICATIONS

This application claims priority under 35 U.S.C. § 119 to Korean Application Nos. 10-2014-0178357, filed on Dec. 11, 2014, and 10-2015-0012622, filed on Jan. 27, 2015, whose entire disclosures are incorporated herein by reference.

BACKGROUND

1. Field

A drinking water supply device capable of supplying mineral water and a method of controlling a drinking water supply device are disclosed herein.

2. Background

In general, a drinking water supply device may be a device that supplies drinking water to a user. The drinking water supply device may be a stand-alone device or may constitute part of an electric home appliance, such as, e.g., a refrigerator.

A drinking water supply device may supply drinking water at room temperature. The drinking water supply device may cool drinking water using a cold water supply unit that includes a refrigeration cycle or may heat drinking water using a hot water supply unit that includes a heater. That is, the drinking water supply device may supply cold water or hot water to a user as needed.

Drinking water may be underground water, raw water or natural water supplied from a faucet, or clean water obtained by filtering raw water. Drinking water may be defined as drinkable water.

Drinking water supply devices may be capable of providing water other than clean water, cold water, or hot water. For example, the drinking water supply device may include a mineral water supply module. The mineral water supply module may provide mineral water that may contain a predetermined amount of minerals to a user.

Minerals may constitute one of five types of nutritional substances along with protein, fat, carbohydrates, and vitamins. Minerals may play an important part in biochemical activity such as, e.g., catalytic activity, in the human body and in the constitution of, for example, the bones and teeth. Mineral elements such as calcium (Ca), potassium (K), magnesium (Mg), and sodium (Na) may be important for metabolism.

Mineral water that may contain these minerals may play a supporting role in improving health, for example, discharging waste matter from the human body and promoting digestion. When a predetermined amount of minerals are in drinking water, the water may taste better than when the user drinks clean water.

To make mineral water in a drinking water supply device, mineral water supply modules, e.g., an electro-analyzer, a mineral filter, and/or a device for directly supplying condensed minerals to clean water, may be applied to the drinking water supply device. The device for directly supplying condensed minerals to clean water may be more compact than other mineral water supply modules.

For example, the mineral water supply module, which may directly supply condensed minerals to clean water, may be configured to have a structure in which minerals discharged from a mineral container in which condensed mineral liquid may be stored may be supplied to a water discharge pipe via a second channel.

Conventional mineral water supply modules may have a second channel with the same inner diameter as a water discharge pipe. As a result, the amount of minerals supplied may easily vary depending upon a pressure from a pump configured to pressurize the second channel. That is, the amount of minerals discharged may change so that the variation in concentration of minerals in mineral water discharged may be high. Thus, the mineral water may taste differently every time a user drinks the water.

When clean water is supplied after mineral water has been discharged, minerals remaining in the second channel may be easily introduced into the clean water. As a result, a large amount of minerals may be discharged so that the clean water provided may taste different.

To directly supply condensed minerals to clean water, a mineral container may be provided to store condensed minerals, and a second channel may connect the mineral container and a drinking water supply line to introduce the condensed minerals to drinking water.

The drinking water supply device may have a quantitative control mode in which a predetermined amount of drinking water may be supplied to a user and a real time control mode in which a desired amount of drinking water may be supplied to the user in real time. In the quantitative control mode, the user may input a command through a quantitative control input unit or quantitative controller provided at the drinking water supply device so the drinking water supply device may supply a predetermined amount of drinking water.

In the real time control mode, the user may use a drinking water discharge button or lever provided at the drinking water supply device instead of inputting a command through the quantitative controller so the drinking water supply device may supply a desired amount of drinking water to the user in real time.

The user may wish to drink mineral water having a uniform taste regardless of whether the quantitative control mode or the real time control mode may be active. To supply mineral water having a uniform taste to the user, variation in the amount of minerals supplied to drinking water based on the amount of the drinking water may be reduced.

For example, in the quantitative control mode, a valve provided in the second channel may be controlled to be turned on or off for a time when pressure in the second channel may be maintained at a predetermined level so a predetermined amount of minerals or condensed minerals may be supplied to drinking water, e.g., clean water, cold water, or hot water.

If the pressure in the second channel deviates from a predetermined range of pressure, the amount of minerals supplied to drinking water may differ from the predetermined amount of minerals with the result that the mineral water may taste different from a predetermined taste.

In the real time control mode, the flow rate of drinking water may be sensed before minerals are supplied to the drinking water so minerals may be supplied to the drinking water in an amount based on the flow rate of the water or drinking water.

If the amount of minerals that are supplied is not adjusted when the flow rate of the drinking water changes, the mineral water may taste differently.

In order to supply condensed minerals stored in the mineral container to drinking water, for example, an air pump may be used.

If external air supplied into the mineral container through an air introduction port of the air pump is contaminated, contaminants in the air may be mixed with the condensed minerals stored in the mineral container, and the taste of the mineral water may change. In addition, the condensed minerals may flow backward from the mineral container to the air pump, and the air pump may be damaged.

BRIEF DESCRIPTION OF THE DRAWINGS

The embodiments will be described in detail with reference to the following drawings in which like reference numerals refer to like elements wherein:

FIGS. 9A and 9B are assembly views of a connection pipe according to another embodiment;

DETAILED DESCRIPTION

In the following description, water that has yet to pass through a filter will be defined as raw water, raw water that has passed through a filter will be defined as clean water, and raw water or clean water containing minerals will be defined as mineral water. Raw water and clean water may be defined as drinking water, or water that a user may drink.

In addition, a front end and a rear end may mean an upstream side and a downstream side in a direction in which a fluid flows forward. The forward flowing direction is a direction in which drinking water flows in a drinking water supply device before the drinking water is discharged out of the drinking water supply device.

Figure 1:
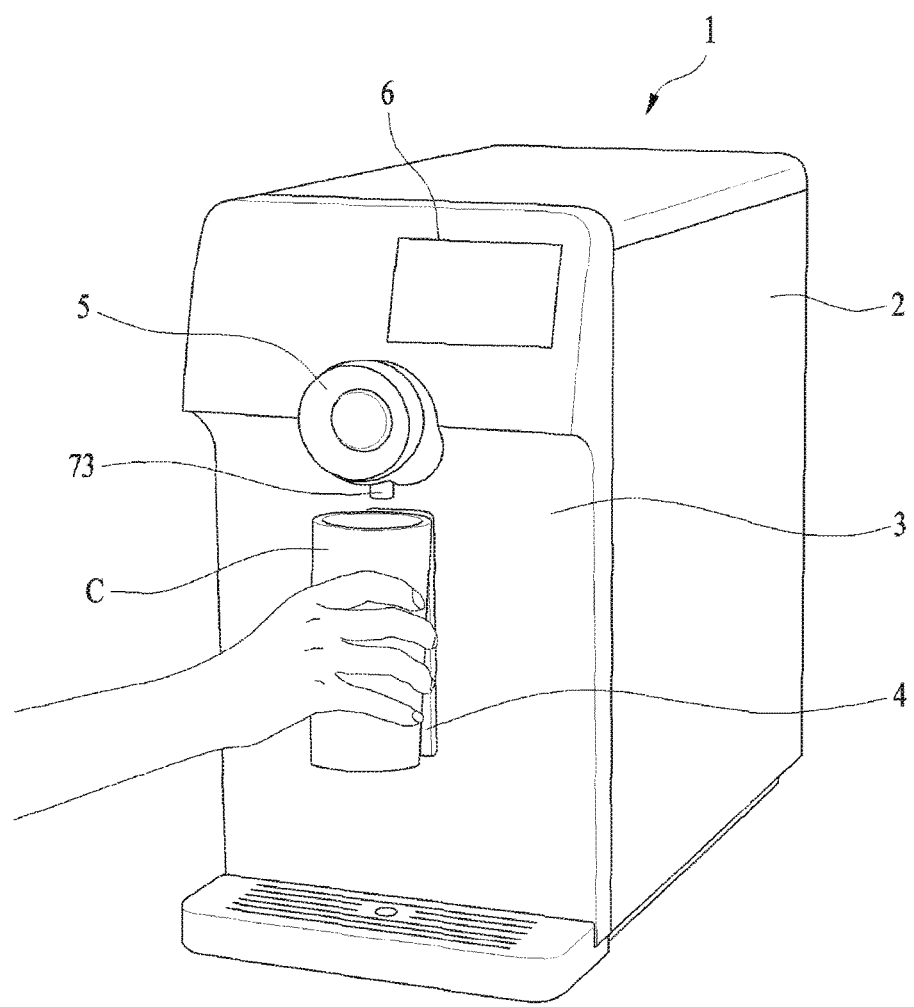
FIG. 1 is a perspective view showing an external appearance of a drinking water supply device according to an embodiment.

FIG. 1 is a perspective view showing an external appearance of a drinking water supply device according to an embodiment. A drinking water supply device 1 may include a cabinet 2 that forms an external appearance of the drinking water supply device 1 and a dispenser 3. The dispenser 3 may be a space in which drinking water may be supplied to a user. The dispenser 3 may be formed on a front or side of the cabinet 2.

The dispenser 3 may be provided with a cock 73 through which drinking water may be discharged. The dispenser 3 may also be provided with a real time control unit or controller 4 and a quantitative control unit or controller 5 configured to control the discharge of drinking water.

The real time controller 4 may be in a shape of a lever that may be pushed or pulled. The quantitative controller 5 may be formed in the shape of a button that may be pushed. Alternatively, the quantitative controller 5 may be controlled by touch from a user.

The user may input a command through the quantitative controller 5 so the drinking water supply device 1 may operate in a quantitative control mode. In the quantitative control mode, the drinking water supply device 1 may be controlled to discharge a predetermined amount of drinking water through the cock 73.

The user may push or pull the real time controller 4, which may be formed in the shape of a lever, rather than inputting a command through the quantitative controller 5. For example, after the user places a cup C under the cock 73, the user may push or pull the lever to fill the cup C with drinking water discharged through the cock 73.

The drinking water supply device 1 may operate in a real time control mode. In the real time control mode, the drinking water supply device 1 may be controlled to discharge drinking water through the cock 73 based on a time period during which the user pushes or pulls the lever. That is, when the user manipulates the lever and does not input a command through the quantitative controller 5, the drinking water supply device 1 may operate in the real time control mode.

The drinking water supply device 1 may further include a mineral water supply module configured to supply minerals to drinking water discharged from the drinking water supply device 1. The drinking water supply device 1 may supply drinking water containing minerals, or mineral water, to the user through the mineral supply module.

The drinking water supply device 1 may be further provided with a display 6 to indicate, for example, a time when a mineral container provided in the mineral water supply module may need to be replaced. The display 6 may be provided separately from the quantitative controller 5, as shown in FIG. 1. Alternatively, the display 6 may be provided with or in the quantitative controller 5.

According to an embodiment shown in FIG. 1, a drinking water supply device 1 may be a stand-alone device. The drinking water supply device 1 may also constitute a part of another device, for example, a refrigerator.

Figure 2:
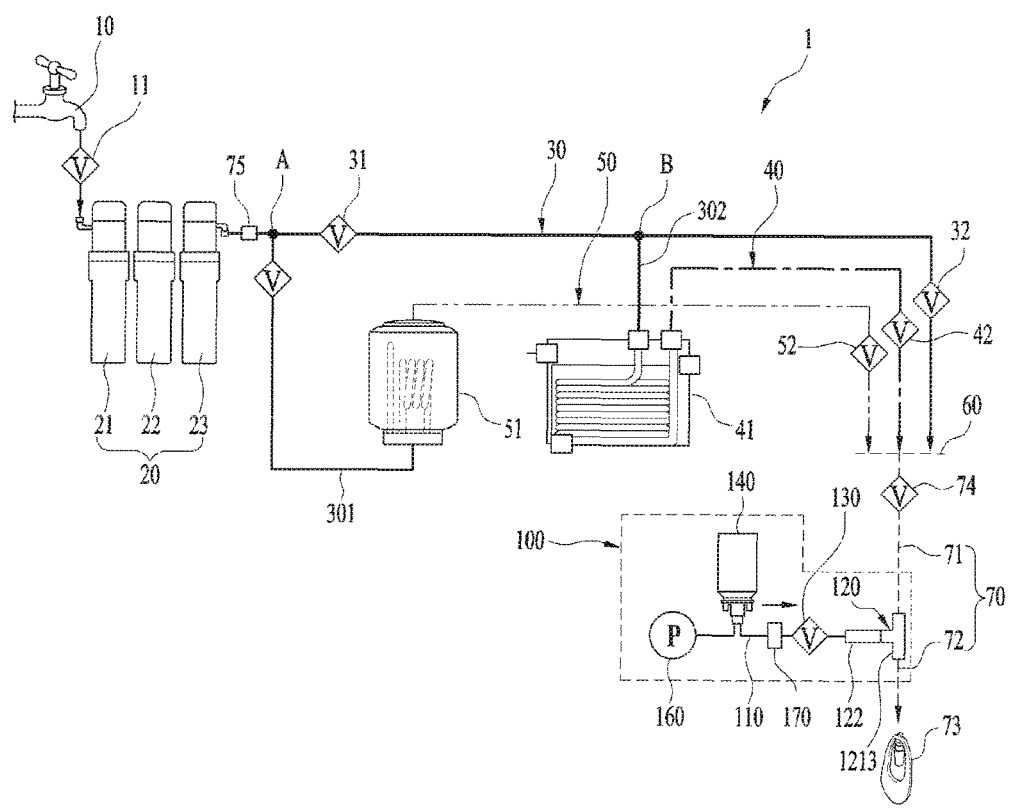
FIG. 2 is a conceptual view of a drinking water supply device according to an embodiment.

FIG. 2 is a conceptual view of the drinking water supply device showing a structure and pipe arrangement according to an embodiment. A drinking water supply device 1 according to the embodiment may convert raw water that may be introduced into the drinking water supply device 1 through an external water tap 10 into clean water using a filter unit 20.

The construction of the filter unit 20 may vary. A plurality of single filters 21, 22, and 23 may constitute the filter unit 20. For example, the filter unit 20 may include, e.g., a pre-carbon filter 21, an ultra-filtration (UF) filter 22, and a post-carbon filter 23. When raw water is filtered by the filter unit 20 into clean water, the clean water may be discharged out of the drinking water supply device 1 through a clean water pipe 30, a clean water supply valve 32, and the cock 73, for example.

According to an embodiment, the drinking water supply device 1 may be configured to supply cold water or hot water according to the demand of the user. Heated clean water or hot water may be discharged out of the drinking water supply device 1, for example, through a first branch clean water pipe 301 that may diverge from point A of the clean water pipe 30 and may be located at the rear end of the filter unit 20, a heating unit 51, a hot water pipe 50, a hot water supply valve 52, and the cock 73.

Cooled clean water or cold water may be discharged out of the drinking water supply device 1, for example, through a second branch clean water pipe 302 that may diverge from a point B that may be further downstream than point A of the clean water pipe 30, a cooling unit 41, a cold water pipe 40, a cold water supply valve 42, and the cock 73.

According to an embodiment shown in FIG. 2, clean water, cold water, and hot water may be discharged through a single cock 73. Cocks for discharging the clean water, the cold water, and the hot water may be provided separately. The clean water and the cold water may be discharged through one cock, and the hot water may be discharged through another cock.

A cock valve or a first valve 74 may be provided at a rear end or a downstream side of the clean water supply valve 32, the cold water supply valve 42, and the hot water supply valve 52. The cock valve 74 may be connected to a distribution pipe 60. The distribution pipe 60 may be connected to the clean water pipe 30, the cold water pipe 40, and the hot water pipe 50.

A water discharge pipe 70, through which clean water, cold water, or hot water may be supplied, may be provided at the rear end of the cock valve 74. Clean water, cold water, or hot water may be supplied into the distribution pipe 60, and, when the cock 73 is opened by the cock valve 74, the clean water, the cold water, or the hot water may be selectively supplied through the water discharge pipe 70.

The mineral water supply module 100, which may supply minerals to drinking water flowing in the water discharge pipe 70, may be connected to the water discharge pipe 70. The mineral water supply module 100 may be connected to a side of the water discharge pipe 70 via a connection pipe 120 that may be connected to the water discharge pipe 70. The connection pipe 120 may function as a mineral water generation unit, in which minerals are mixed with drinking water.

The water discharge pipe 70 may include a first channel 71 connected to the front end of the connection pipe 120 and a water discharge channel 72 connected to the rear end of the connection pipe 120.

When the cock valve 74 is opened, clean water, cold water, or hot water may flow into the first channel 71 toward the cock 73 and may be introduced into the connection pipe 120 before the clean water, the cold water, or the hot water may be discharged through the cock 73.

The first channel 71 may be provided at an upstream side of the connection pipe 120 to supply drinking water, e.g., clean water, cold water, or hot water, to the connection pipe 120.

The water discharge channel 72 may be provided between the connection pipe 120 and the cock 73 to selectively discharge mineral water made in the connection pipe 120 through the cock 73.

A mineral water supply module 100 according to an embodiment may include a mineral container 140 configured to store condensed mineral liquid, a pump 160 configured to pressurize the mineral container 140, a second channel 110 connecting the connection pipe 120 and the mineral container 140, a pressure sensor 170 provided in the second channel 110, and a mineral valve or a second valve 130 provided in the second channel 110 to selectively supply minerals to the connection pipe 120.

Minerals supplied from the mineral water supply module 100 to the connection pipe 120 may be highly concentrated condensed minerals. The mineral container 140 may store condensed mineral liquid in which minerals, such as, e.g., calcium (Ca), potassium (K), magnesium (Mg), and sodium (Na), may be mixed. For example, the concentration of minerals in the condensed mineral liquid stored in the mineral container 140 may be about 200 times the average concentration of minerals contained in clean water.

According to experimental results of an embodiment disclosed herein, the amount of condensed mineral liquid to make mineral water with a taste user's like is 0.0006 parts per part of clean water.

It may be necessary to supply a predetermined very small amount of minerals for a predetermined time to minimize the variation in the supply of the minerals. The amount of minerals supplied from the mineral water supply module 100 to the connection pipe 120 may be determine the taste of the mineral water discharged through the cock 73.

The amount of minerals supplied from the mineral water supply module 100 to the connection pipe 120 may be much smaller than the flow rate of drinking water, e.g., clean water, cold water, or hot water, flowing in the connection pipe 120.

Consequently, the connection pipe 120 may be provided with a second pipe 122. That is, condensed minerals may be supplied to the drinking water flowing in the connection pipe 120 through the second pipe 122.

For example, the connection pipe 120 may be in a T shape. The connection pipe 120 may be provided with a mixing pipe 1213 provided between the first channel 71 and the water discharge channel 72 parallel to the first channel 71 and the water discharge channel 72 and a second pipe 122 may be configured to supply condensed minerals to the mixing pipe 1213 in a direction perpendicular to the mixing pipe 1213.

Figure 3:
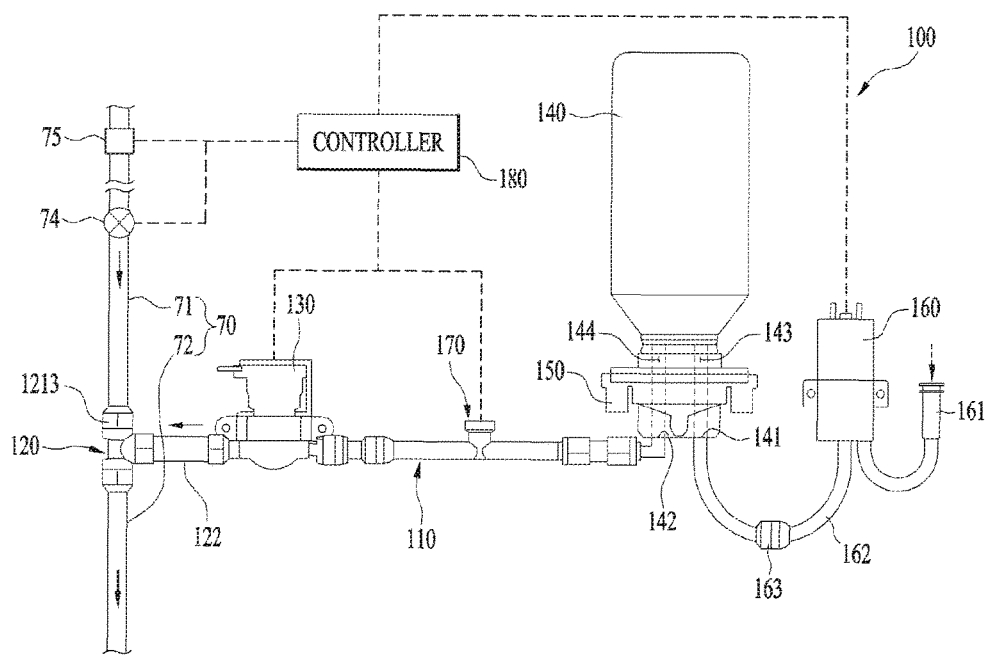
FIG. 3 is a schematic view of a mineral water supply module according to an embodiment.
Figure 4A:
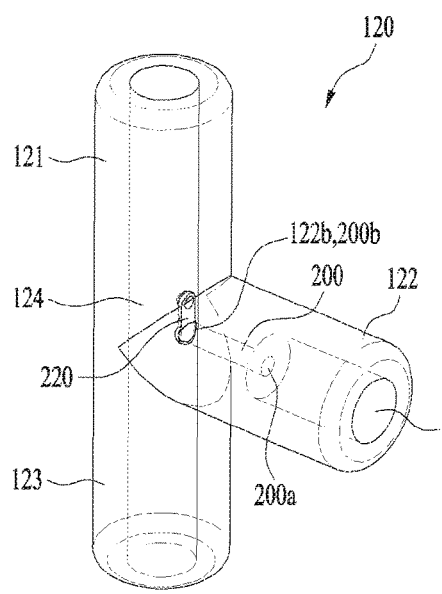
FIG. 4A is a perspective view of a connection pipe according to an embodiment.
Figure 4B:
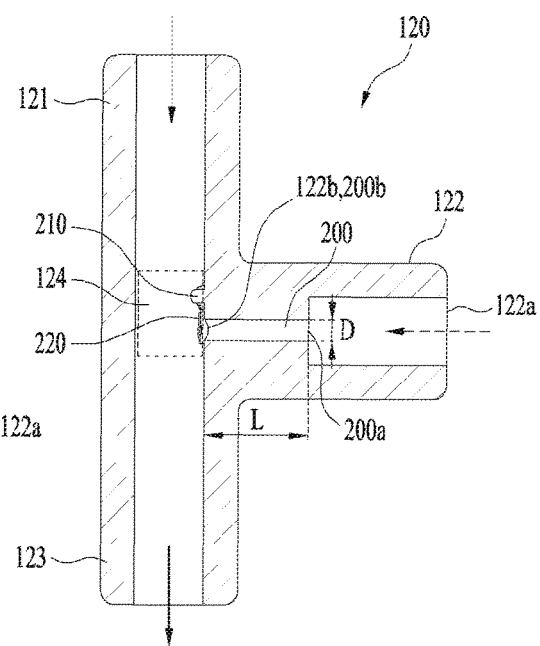
FIG. 4B is a cross-sectional view of the connection pipe of FIG. 4A showing a flow direction.

FIG. 3 is a schematic view of a mineral water supply module according to an embodiment. Hereinafter, the cock valve 74 will be called a first valve 74.

According to embodiments as shown in FIGS. 2 and 3, a drinking water supply device 1 may include a water discharge pipe 70, a flow rate sensor 75 to sense the flow rate of the water, a connection pipe 120 of a second channel extending to a side of the water discharge pipe 70, a second channel 110 configured to supply minerals to the connection pipe 120, a mineral container 140 configured to store condensed minerals, and a pump 160 configured to pressurize the mineral container 140.

The water discharge pipe 70 may be provided with a first channel 71 and a water discharge channel 72. The first channel 71 may be located further upstream than the water discharge channel 72. The first channel 71 may be configured such that drinking water flows in the first channel 71, and the first channel 71 may be provided with a first valve 74 that selectively opens and closes the first channel 71.

The flow rate sensor 75 may be configured to sense the flow rate of the water flowing in the water discharge pipe 70. The flow rate sensor 75 may be configured to sense the flow rate of the water flowing in the first channel 71 in real time.

The flow rate sensor 75 may be provided at the clean water pipe 30 at the rear end of the filter unit 20. The flow rate sensor 75 may be provided in the first channel 71. That is, the flow rate sensor 75 may be provided in a pipe or a channel located further upstream than the connection pipe 120 to sense the flow rate of drinking water.

The water discharge channel 72 may be connected or coupled to a rear end of the first channel 71 to discharge drinking water. That is, drinking water may sequentially flow through the first channel 71 and the water discharge channel 72 and may then be discharged through the cock 73.

The connection pipe 120 may be provided between and may connect the first channel 71 and the water discharge channel 72. The connection pipe 120 may be in a T shape and may be provided with a mixing pipe 1213 to guide the drinking water from the first channel 71 to the water discharge channel 72 and a second pipe 122 that defines a condensed mineral channel extending perpendicular to the mixing pipe 1213.

When condensed minerals are guided to the mixing pipe 1213, the pressure applied to the condensed minerals may be reduced while the condensed minerals pass through the second pipe 122. The cross-sectional diameter of the second pipe 122 may be less than the length of the second pipe 122, and the cross-sectional area of the second pipe 122 may be less than the cross-sectional area of the mixing pipe 1213, for example. Thus, it may be possible to accurately control the amount of condensed minerals guided to the mixing pipe 1213.

The second channel 110 may be configured to supply minerals, for example, condensed minerals, to the connection pipe 120. That is, the second channel 110 may be formed as a mineral supply pipe or a mineral supply line. An end of the second channel 110 may be connected to the connection pipe 120. For example, an end in a longitudinal direction of the second channel 110 may be connected to the second pipe 122 of the connection pipe 120.

The pressure at which condensed minerals may be supplied through the second channel 110 may be reduced by the second pipe 122. That is, the second pipe 122 may reduce the pressure at which condensed minerals may be supplied through the second channel 110.

A second valve or a mineral supply valve 130 and a pressure sensor 170 may be provided in the second channel 110. The second valve 130 may be configured to selectively open and close the second channel 110, and the pressure sensor 170 may be configured to sense the pressure in the second channel 110 or the pressure at which condensed minerals flow in the second channel 110.

The second valve 130 may be provided in the second channel 110 such that the second valve 130 may be closer to the connection pipe 120 than the pressure sensor 170. That is, the pressure sensor 170 may be provided further upstream of the second channel 110 than the second valve 130.

A mineral container 140 may be configured to store condensed minerals. The mineral container 140 may be connected to the connection pipe 120 via the second channel 110. For example, a first end in a longitudinal direction of the second channel 110 may be connected to the connection pipe 120, and a second end in a longitudinal direction of the second channel 110 may be connected to the mineral container 140.

A pump 160 may be configured to pressurize an interior of the mineral container 140 to discharge the condensed minerals stored in the mineral container 140. For example, the pump 160 may be an air pump. The pump 160 may be an air pump that may suction external air and inject the suctioned air into the mineral container 140.

Thus, the pump 160 may suction external air and inject the suctioned air into the mineral container 140 to increase the pressure in the mineral container 140. When the pump 160 injects external air into the mineral container 140, the condensed minerals stored in the mineral container 140 may be discharged out of the mineral container 140 due to an increase of the pressure in the mineral container 140.

The condensed minerals discharged out of the mineral container 140 may flow into the second channel 110. As a result, the pressure in the second channel 110 may increase. The pressure in the mineral container 140 may be equal to the pressure in the second channel 110 as the interior of the mineral container 140 may communicate with the second channel 110.

A lower part of the mineral container 140 may be provided with an injection hole 141 through which external air may be injected into the mineral container 140 and a discharge hole 142 through which the condensed minerals may be discharged from the mineral container 140.

The condensed minerals stored in the mineral container 140 may be directed to the lower side of the mineral container 140 due to gravity. The mineral container 140 may be more airtight because the injection hole 141 and the discharge hole 142 may be formed at the lower part of the mineral container 140.

According to embodiments disclosed herein, a drinking water supply device 1 may further include a container fastening unit or container fastener 150 that may be configured to fasten to or at a lower side of the mineral container 140. An injection hole 141 and the discharge hole 142 may be formed at the lower end of the container fastener 150.

The container fastener 150 may be provided with an air injection channel 143 that communicates with the injection hole 141 and a mineral discharge channel 144 that communicates with the discharge hole 142. The injection hole 141 may communicate with an interior of the mineral container 140 through the air injection channel 143, and the discharge hole 142 may communicate with the interior of the mineral container 140 through the mineral discharge channel 144.

As the pump 160, e.g., the air pump, may be configured to inject air into the mineral container 140, the airtightness of the mineral container 140 may be maintained in order to discharge the required amount of condensed minerals from the mineral container 140.

As the mineral container 140 may be provided at or on the upper side of the container fastening unit 150, and the injection hole 141 and the discharge hole 142 may be provided at the lower end of the container fastening unit 150, the mineral container 140 may be more airtight.

An air filter 161 may be provided at the air inlet side of the pump 160. The air filter 161 may function to filter impurities contained in the air injected into the mineral container 140 when the pump 160 operates. The air filter 161 may be made of a hydrophobic member.

A check fitting or check valve 163 may be provided in a connection line 162 that connects between the pump 160 with the mineral container 140 or the container fastener 150.

The check fitting or check valve 163 may prevent minerals from flowing backward from the mineral container 140 to the pump 160. If minerals flow backward to the pump 160, the pump 160 may be damaged.

Referring to FIG. 2, a mineral water supply module 100 may include a first channel 71 configured to supply clean water, a second channel 110 configured to supply minerals, and a water discharge channel 72 through which clean water or clean water containing minerals, e.g., mineral water, may be selectively discharged based on whether or not the minerals may be supplied.

The mineral water supply module 100 may be provided with a mineral container 140 configured to store condensed minerals and to supply the stored condensed minerals to the second channel 110 and with a pump 160 configured to pressurize the mineral container 140 or the second channel 110 to discharge the minerals stored in the mineral container 140 to the second channel 110. The pump 160 may be connected to the second channel 110.

A second valve 130 may be provided in the second channel 110 to selectively open and close the second channel 110 based on whether or not mineral water should be made. The second valve 130 may be provided at a rear end of the mineral container 140. The second valve 130 may be provided in the second channel 110 such that the second valve 130 may be adjacent to the first channel 71.

The mineral container 140 may be connected to the second channel 110 via the container fastener 150 connecting the second channel 110 to the mineral container 140. The mineral container 140 may be separately connected to the container fastener 150 such that the mineral container 140 may be easily replaced when the minerals in the mineral container 140 may be consumed or when the minerals contained in the mineral container 140 may not have been used for a long time.

The mineral water supply module 100 may be configured as a compact-sized module type unit that includes a second channel 110, a replaceable mineral container 140, a pump 160, and a second valve 130. The mineral water supply module 100 may be applied to various drinking water supply devices.

The mineral water supply module 100 may include a connection pipe 120 in which clean water from the first channel 71 and minerals supplied from the second channel 110 may be mixed to form mineral water.

A first pipe 121 that connects to the first channel 71, a second pipe 122 that connects to the second channel 110, and a third pipe 123 that connects to the water discharge channel 72 may be formed at the connection pipe 120. That is, the first pipe 121 and the third pipe 123 may constitute the mixing pipe 1213.

According to embodiments described herein, a micro channel 200 defining a micro mineral supply line through which a micro amount of minerals may be supplied may be provided in the second pipe 122 to provide mineral water in which the variation in concentration of minerals may be minimized. The micro channel 200 may define a channel in which a micro amount of minerals uniformly flow for a predetermined time in order to minimize the variation in amount of minerals that may be discharged.

FIGS. 4 to 7 show a connection pipe according to an embodiment. Referring to FIGS. 4A and 4B, a connection pipe 120 may include a first pipe 121 that connects to the first channel 71, a second pipe 122 that connects to the second channel 110, and a third pipe 123 that connects to the water discharge channel 72.

A mixing space 124 in which minerals are mixed with clean water may be provided between the first pipe 121 and the second pipe 122. The second pipe 122 may be connected to the first pipe 121 at a predetermined angle relative to the first pipe 121.

Clean water introduced from the first channel 71 may flow in a first direction in the first pipe 121, and minerals introduced from the second channel 110 may flow differently in a second direction in the second pipe 122. The clean water flowing in the first direction and the minerals flowing in the second direction may be introduced into the mixing space 124. The minerals may collide with the clean water in the mixing space 124 and may be easily mixed with the clean water.

The third pipe 123 may be connected to the first pipe 121 such that a fluid may flow in the third pipe 123 in the first direction. Clean water or mineral water generated in the mixing space 124 may flow in the first direction and may then be discharged through the third pipe 123. The inner diameter of the second pipe 122 may vary to adjust the amount of minerals discharged in a direction that the minerals flow.

An introduction end 122*a* through which minerals are introduced from the second channel 110 to the second pipe 122 may be provided at the second pipe 122 that connects to the second channel 110. The inner diameter of the introduction end 122*a* may be equal to the inner diameter of the second pipe 122. The introduction end 122*a* may extend a predetermined length in the direction that the minerals flow.

According to embodiments, a micro channel 200 provided between the introduction end 122*a* and a discharge end 122*b* may be provided in the second pipe 122. The discharge end 122*b* may be provided at an extremity of the second pipe 122. Minerals introduced into the micro channel 200 may be discharged into the mixing space 124 through the discharge end 122*b*.

The micro channel 200 may function to supply a micro amount of minerals to the mixing space 124 for a predetermined amount of time to minimize the variation in concentration of minerals in the mineral water discharged. For example, 0.075 ml of minerals may be required for 120 ml of clean water in order to generate one cup of mineral water. That is, the amount of condensed mineral liquid that may be required to generate mineral water is 0.0006 parts per part of clean water. In order to provide mineral water that tastes the same every time within an allowable deviation, a predetermined fixed amount of minerals may be supplied for a predetermined time.

It may be possible to reduce the inner diameter of the first channel 71 to generate mineral water and reduce the amount of clean water that may be supplied. When the inner diameter of the first channel 71 is reduced, it may not be possible to provide drinking water to the user within a short amount of time, thus limiting the reduction of the inner diameter of the first channel 71.

According to embodiments disclosed herein, an amount of minerals discharged from a second channel 110 may be adjusted using a micro channel 200. The micro channel 200 may have a small diameter in order to supply a predetermined and very small amount of minerals to the mixing space 124 for a predetermined time. In addition, the micro channel 200 may have a predetermined length in order to induce a loss in pressure of a fluid.

The micro channel 200 may be in a cylindrical shape that has a predetermined diameter D and a predetermined length L. When the pressure from the pump 160 is uniform, the amount of minerals discharged from the micro channel 200 may be decided based on the diameter and the length of the micro channel 200.

The diameter of the micro channel 200 may range from 0.5 mm to 1.0 mm. The minimum diameter of the micro channel 200 may be 0.5 mm. If the minimum diameter of the micro channel 200 is less than 0.5 mm, it may not be easy to mold or machine the micro channel 200 and may result in lower productivity.

The maximum diameter of the micro channel 200 may be predetermined or set such that a predetermined and very small amount of minerals may be supplied for a predetermined time. The diameter of the micro channel 200 may be predetermined or set so clean water may be discharged within an allowable deviation in taste after the mineral water is discharged. That is, the diameter of the micro channel 200 may be set or predetermined so the minerals that remain in the micro channel 200 may be minimal in the clean water discharged after the mineral water is discharged.

Thus, the maximum diameter of the micro channel 200 of the mineral water supply module 100 may be 1.0 mm. The diameter of the micro channel 200 may be derived based on the first channel having an outer diameter of 6.35 mm and the pump having a discharge flow rate of 0.1 ml/s to 1 ml/s.

Figure 5:
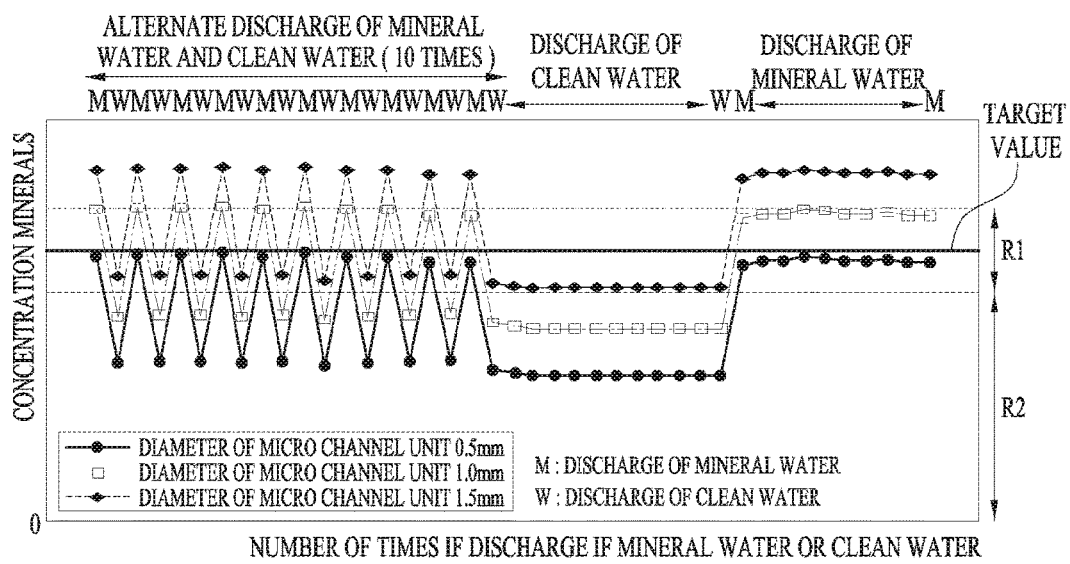
FIG. 5 is a graph showing the change in concentration of minerals based on a diameter of a second pipe when mineral water or clean water may be discharged from a mineral water supply module according to an embodiment.

FIG. 5 is a graph showing a change in concentration of minerals based on a diameter of a micro channel when mineral water or clean water may be discharged. A mineral water supply module 100 according to an embodiment may provide mineral water or clean water to the user. The user may distinguish between mineral water and clean water based on taste.

Mineral water may have a unique taste and may be distinguished from clean water based on the kind of minerals contained in the mineral water. In general, clean water may contain a predetermined amount of minerals even when additional minerals may not be supplied to the clean water. This may be because minerals contained in raw water supplied to the drinking water supply device 1 may remain in the raw water even after the raw water passes through the filter unit.

The amount of minerals in clean water provided to the user may vary depending upon the amount of minerals contained in raw water or the kind of filter. However, the amount of minerals contained in clean water obtained after raw water passes through the filter unit 20 may be very small. Thus, it may be difficult for the user to taste the minerals in the clean water. The amount of minerals contained in the clean water and the amount of minerals contained in the mineral water may differ greatly from each other.

In addition, the amount of minerals contained in the raw water introduced into the drinking water supply device 1 may differ depending upon the flow rate of the raw water, the season, or the region. The amount of minerals contained in clean water or mineral water may have a predetermined range of deviation. That is, the clean water discharged after a predetermined amount of minerals has been filtered by the filter unit 20 of the drinking water supply device 1 may have a predetermined range of deviation in concentration of minerals.

Mineral water generated by the mineral water supply module 100 and then discharged may also have a predetermined range of deviation in concentration of minerals that may be different from the range of deviation in concentration of minerals in the clean water.

A predetermined range of deviation in concentration of minerals in clean water will be referred to as a mineral concentration deviation range R2 of clean water, and a predetermined range of deviation in concentration of minerals in mineral water will be referred to as a mineral concentration deviation range R1 of mineral water for the convenience of description.

The mineral concentration deviation range R1 of the mineral water may be derived based on an allowable deviation in taste of water where the user may taste better tasting water. Alternatively, the mineral concentration deviation range R1 of the mineral water may be a concentration deviation range of minerals contained in mineral water measured after the target amount of minerals to be supplied may be predetermined or set, in order to provide mineral water containing a predetermined amount of minerals, and after a predetermined fixed amount of minerals may be supplied.

In the mineral water supply module 100, the micro channel 200 may be connected to the first channel 71. As minerals are supplied, the mineral concentration deviation range R1 of the mineral water may be easily changed based on the variation in amount of minerals supplied from the micro channel 200. That is, the smaller the diameter of the micro channel 200, the smaller the amount of minerals that may be supplied. It may be possible to accurately control the amount of minerals supplied and to reduce the variation in concentration range of minerals contained in mineral water.

FIG. 5 is a graph that shows a variation in concentration of minerals contained in mineral water and clean water based on the diameter of the micro channel 200 from experiments according to an embodiment. In addition, the graph shows the change in concentration of minerals based on a predetermined number of times when mineral water and clean water may be alternately discharged, a predetermined number of times when clean water may be continuously discharged after mineral water has been discharged, and a predetermined number of times when mineral water may be continuously discharged after clean water has been discharged. In FIG. 5, the micro channel 200 has a diameter of 0.5 mm, 1.0 mm, or 1.5 mm.

The predetermined mineral concentration deviation range R1 of the mineral water may have a range between the upper limit U and the lower limit L based on a target mineral concentration value. The upper limit U and the lower limit L may be ±15% the target mineral concentration.

According to the experimental results, the optimum mineral concentration deviation range R2 of the clean water may be 0 or more, which may be less than the lower limit L of the mineral concentration deviation range R1 of the mineral water.

When the micro channel 200 has a diameter of 0.5 mm, a minimum diameter in consideration of productivity, the distribution of mineral concentration may approximate the target amount of minerals to be supplied. In addition, the mineral concentration may have a small distribution within the mineral concentration deviation range R1 of the mineral water. The concentration of minerals in the clean water may be less than the upper limit of the mineral concentration deviation range R2 of the clean water.

When the micro channel 200 has a diameter of 1.0 mm, an allowable maximum diameter, the concentration of minerals contained the mineral water may be within the mineral concentration deviation range R1 of the mineral water but may approach the upper limit U of the mineral concentration deviation range R1 of the mineral water.

The concentration of minerals contained in the clean water may be less than the upper limit of the mineral concentration deviation range R2 of the clean water, but may more closely approach the upper limit of the mineral concentration deviation range R2 of the clean water than when the micro channel 200 may have a diameter of 0.5 mm.

When the micro channel 200 has a diameter of 1.5 mm, the concentration of minerals contained the mineral water may exceed the upper limit U of the mineral concentration deviation range R1 of the mineral water. The concentration of minerals contained in the clean water may be greater than the upper limit of the mineral concentration deviation range R2 of the clean water. That is, when the micro channel 200 has a diameter of 1.5 mm, the amount of minerals contained in the clean water may be equivalent to the amount of minerals contained in the mineral water. As a result, clean water may taste like mineral water to the user. When the micro channel 200 has a diameter of 1.5 mm, it may be possible to provide mineral water and clean water deviating from the allowable deviation in taste.

Thus, when the micro channel 200 according to the embodiment has a diameter of 0.5 mm to 1.0 mm, it may be possible to supply mineral water and clean water within the allowable deviation in taste of water. In addition, the smaller the diameter of the micro channel 200, the more consistently mineral water that has a desired taste may be supplied.

It may be possible to adjust the amount of minerals discharged by varying the length of the micro channel 200 with a predetermined diameter. The micro channel 200 may have a shape in which the length of the micro channel 200 may be greater than the cross-sectional area of the micro channel 200.

When the micro channel 200 has a predetermined length range, it may be possible to reduce the pressure applied to minerals flowing in the micro channel 200 to thus discharge a predetermined amount of minerals. In addition, it may reduce an effect caused by variation in pressure that may occur due to the operation of the pump 160.

When the micro channel 200 has a length less than the lower limit of the predetermined length range, the reduction in pressure applied to the minerals flowing in the micro channel 200 may be small with the result that a larger amount of minerals than the predetermined amount of minerals may be discharged. When the micro channel 200 is short, the pressure applied to minerals introduced from the second channel 110 may not be sufficiently reduced due to frictional loss. Thus, the amount of the minerals discharged may be greater than the predetermined amount of minerals to be discharged.

When the micro channel 200 is longer than the upper limit of the predetermined length range, the pressure applied to the minerals flowing in the micro channel 200 may be so excessively reduced due to friction that a smaller amount of minerals than the predetermined amount of minerals may be discharged.

To discharge a fixed amount of minerals within an appropriate range, therefore, the micro channel 200 may have a corresponding appropriate length. For example, the micro channel 200 may have a length ranging from 15 mm to 20 mm.

In addition, the pump 160 may be a constant pressure pump that applies a predetermined pressure P. That is, when the pump 160 pressurizes the minerals in the micro channel 200 having the predetermined diameter D and the predetermined length L at the predetermined pressure P, a fixed amount of minerals may be discharged.

According to embodiments disclosed herein, a mineral water supply module 100 may be selected to alternatively provide clean water or mineral water. In the mineral water supply module 100, the second pipe 122 may be located between the connection pipe 120 and the second valve 130. Even when the second valve 130 is closed, some minerals may remain in the second pipe 122.

For example, after mineral water is discharged, the pipe channel of the micro channel 200 connected to the first pipe 121 may remain filled with minerals. When clean water is selected by the user after mineral water has been discharged, the minerals remaining in the micro channel 200 may move into the clean water introduced from the first channel 71.

To achieve natural equilibrium between materials, movement from high concentration to low concentration may occur. Since there may be a large difference in concentration of minerals between the clean water and the condensed minerals, the condensed minerals may move toward the clean water to achieve natural equilibrium between liquids that have different concentrations.

The larger the diameter of the discharge end 122b of the second pipe 122, which may be connected to the connection pipe 120, the more this phenomenon may occur. Thus, the micro channel 200 may function not only to discharge a very small fixed amount of minerals as described above but also to minimize the discharge of minerals due to a concentration equilibrium phenomenon when clean water is discharged.

For example, when the micro channel 200 has the minimum diameter D in order to discharge a fixed amount of minerals and has a predetermined length L in order to achieve a sufficient reduction in pressure, it may be possible to minimize the amount of minerals discharged even when clean water may be supplied. Even when clean water is discharged after mineral water has been discharged, it may be possible to supply clean water within the allowable deviation in taste.

Figure 6A:
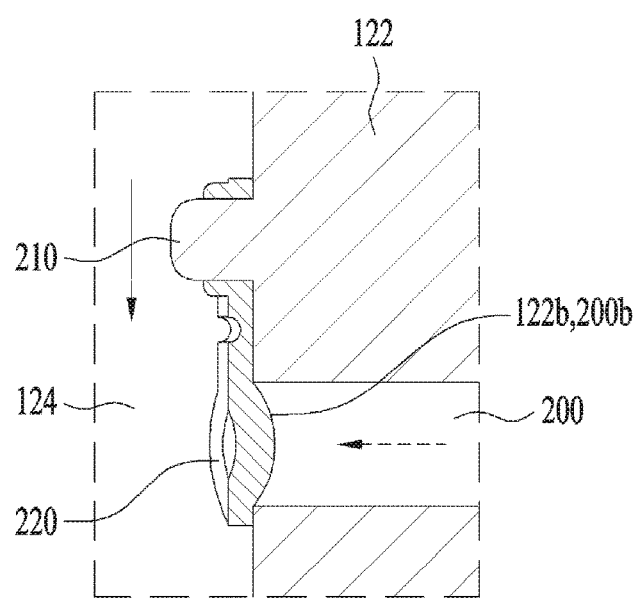
FIG. 6A is a conceptual view of an opening and closing member according to an embodiment.
Figure 6B:
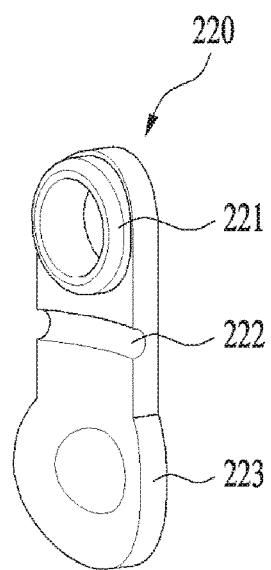
FIG. 6B is a perspective view of FIG. 6A according to an embodiment.

Referring to FIGS. 6A and 6B, the mineral water supply module 100 may further include an opening and closing member 220 configured to selectively open and close the micro channel 200 and to prevent the occurrence of the concentration equilibrium phenomenon when clean water and mineral water are alternately discharged. The opening and closing member 220 may be provided in the discharge end 122b of the second pipe 122. The second pipe 122 may be provided at an end where the discharge end 122b of the second pipe 122 may be formed with a protrusion 210 that fixes the opening and closing member 220.

The opening and closing member 220 may include a fixing part or ring 221 fixed at a side of the protrusion 210 and a deformable part or flap 223 extending a predetermined length in a longitudinal direction of the first channel 71 to close the discharge end 122b of the of the second pipe 122.

The protrusion 210 may be formed at a surface of the discharge end 122b of the second pipe 122 such that the protrusion 210 may protrude a predetermined height. The fixing part 221 may be fixed to the protrusion 210 by force-fitting or welding.

The opening and closing member 220 may further include a deformable groove 222 provided between the fixing part 221 and the deformable part 223 that allows easy deformation of the deformable part 223 and that minimizes the deformation of the fixing part 221.

The thickness of the deformable groove 222 may be less than the thickness of the fixing part 221 or the deformable part 223. The displacement of the deformable groove 222 may increase, and the displacement of the fixing part 221 may decrease due to the pressure from the pump 160. Further, the deformable groove 222 may be prevented from being separated from the protrusion 210 due to excessive deformation of the fixing part 221.

The opening and closing member 220 and the protrusion 210 may protrude into the mixing space 124. The opening and closing member 220 may be parallel to the first pipe 121 and may be perpendicular to the micro channel 200.

When clean water is discharged, the opening and closing member 220 may close the discharge end 122b of the second pipe 122 due to the pressure that discharges the clean water introduced from the first pipe 121 to the mixing space 124 in the first direction.

When mineral water is discharged, the opening and closing member 220 may open the discharge end 122b of the second pipe 122 due to the pressure that discharges the mineral water supplied from the second pipe 122 in the second direction.

The deformable part 223 may deform into the mixing space 124 by a predetermined angle due to the pressure in which the pump 160 may pressurize minerals discharged through the discharge end 122b of the second pipe 122 with the result that the discharge end 122b of the second pipe 122 may be opened. That is, when the pressure from the pump 160 is a predetermined level or higher, the opening and closing member 220 may open the micro channel unit 200.

The opening and closing member 220 may be made of a soft synthetic resin or a rubber material so the opening and closing member 220 may be easily deformed when pressure is applied. For example, the opening and closing member 220 may be made of, e.g., urethane, ethylene propylene diene monomer rubber (EPDM), or nitrile butadiene rubber (NBR).

The connection pipe 120 may be configured to have a structure in which the first pipe 121 may be connected to the extremity 200b of the micro channel unit 200 and the protrusion 210 and the opening and closing member 220 may protrude into the mixing space 124. However, it may be difficult to manufacture the connection pipe 120.

Figure 7A:
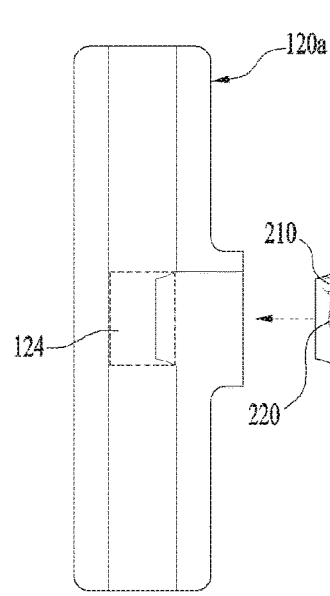
FIGS. 7A and 7B are assembly views showing a connection pipe according to an embodiment.
Figure 7B:
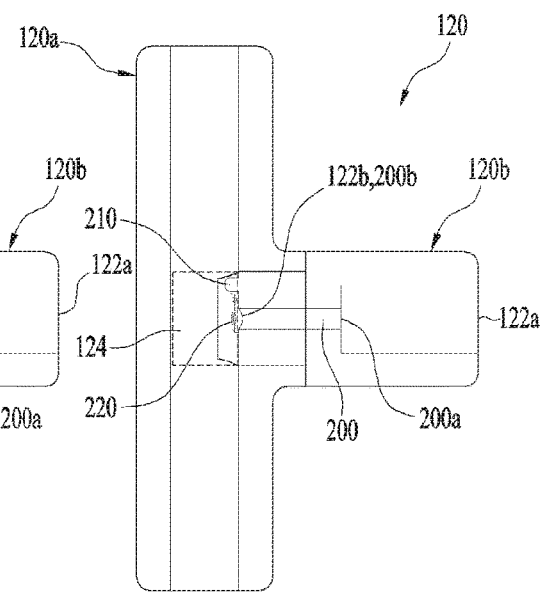

Referring to FIGS. 7A and 7B, a connection pipe 120 according to an embodiment may include a first body 120a that forms the first pipe 121 and the third pipe 123 and a second body 120b that forms the second pipe 122. The first body 120a and the second body 120b may be coupled to each other. The connection pipe 120 according to the embodiment may be easier to manufacture.

The first body 120a may be configured such that the first pipe 121 and the third pipe 123 may be linearly connected. The first body 120a may include a protrusion that protrudes out a predetermined height between the first pipe 121 and the third pipe 123. The first body 120a may be in a T shape where a second direction pipe may be formed at a side of a first direction pipe channel such that the second direction pipe may be perpendicular to the first direction pipe channel.

The connection pipe 120 may include a second body 120b that forms the second pipe 122. The second body 120b may be inserted into the protrusion of the first body 120a. The second body 120b may be provided with an introduction end 122a and a micro channel 200 into which minerals may be supplied from the second channel 110. In addition, the second body 120b may be provided with a protrusion 210 and an opening and closing member 220 formed on the side of the discharge end 200b of the micro channel 200.

A first side of the second body 120b connected to the second channel 110 may extend a predetermined length and may have the same outer diameter and inner diameter as the second channel 110. The micro channel 200 may be provided at a second side of the second body 120b. That is, the second body 120b may be configured such that the inner diameter of the second body 120b may be reduced in a direction that minerals flow.

The second body 120b may be provided with a step part having an outer diameter corresponding to the inner diameter of the protrusion such that the step part may be inserted into the pipe channel of the protrusion of the first body 120a.

The first body 120a and the second body 120b may be coupled to each other by inserting the step part into the pipe channel of the protrusion. In addition, the outer circumferential surfaces of the protrusion of the first body 120a and the step part of the second body 120b that contact may be welded to connect the first body 120a and the second body 120b and to prevent water leakage.

That is, the second body 120b, in which the micro channel 200, the protrusion 210, and the opening and closing member 220 have been previously formed, may be inserted into the first body 120a, and the second body 120b may be fixed to the first body 120a. Thus, the connection pipe 120 may be more easily configured. In addition, the structure of the connection pipe 120 may be simplified, productivity may be improved, and manufacturing costs may be reduced.

Figure 8A:
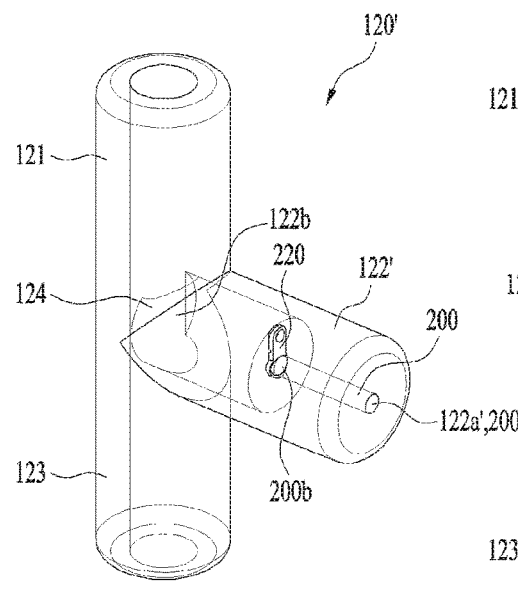
FIG. 8A is a perspective view showing a connection pipe according to another embodiment.
Figure 8B:
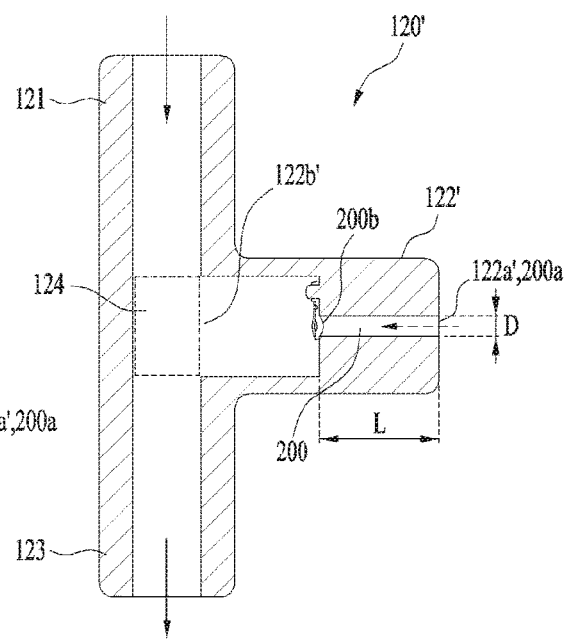
FIG. 8B is a cross-sectional view of the connection pipe of FIG. 8A showing a flow direction.

FIGS. 8 and 9 show a connection pipe according to another embodiment. Referring to FIGS. 8A and 8B, a connection pipe 120' according to another embodiment may include a first pipe 121 connected to the first channel 71, a second pipe 122' connected to the second channel 110, and a third pipe 123 connected to the water discharge channel 72. A mixing space 124 where minerals may be mixed with clean water may be formed between the first pipe 121 and the second pipe 122'.

The second pipe 122' may be configured such that the inner diameter of the second pipe 122' may increase to adjust the amount of minerals that are discharged in a direction in which the minerals flow. That is, the second pipe 122' may be provided with a micro channel 200 at an introduction end 122a' connected to the second channel 110.

For example, an introduction end 200a of the micro channel 200 may be formed at the introduction end 122a' of the second pipe 122', and the micro channel 200 may extend a predetermined length. In addition, a protrusion 210 and an opening and closing member 220 may be provided at a discharge end 200b of the micro channel 200.

The micro channel 200, the protrusion 210, and the opening and closing member 220 were described when describing the connection pipe according to the previous embodiment of the present application, and therefore a further detailed description thereof will be omitted.

The second pipe 122' may be connected to the mixing space 124 where the inner diameter of the second pipe 122' may increase at the discharge end 200b of the micro channel 200. A mineral storage space where minerals discharged from the micro channel 200 may be introduced and temporarily stored may be formed between the discharge end 200b of the micro channel 200 and the mixing space 124.

The minerals discharged from the micro channel 200 into the mineral storage space may move to the mixing space 124 according to a diffusion phenomenon that moves toward equilibrium in concentration between the minerals and the clean water introduced from the first pipe 121. In addition, clean water may be introduced into the mineral storage space so the minerals may be preliminarily mixed with the clean water.

Referring to FIGS. 9A and 9B, a connection pipe 120' according to another embodiment may include a first body 120a' that integrally forms the first pipe 121 and the third pipe 123 and a second body 120b' that forms the second pipe 122. The first body 120a' and the second body 120b' may be coupled to each other.

The first body 120a' may be configured such that the first pipe 121 and the third pipe 123 may be linearly connected. The first body 120a' may include a protrusion that protrudes out at a predetermined height between the first pipe 121 and the third pipe 123.

The protrusion may be provided with a mineral storage space that may have a cross-sectional area greater than the cross-sectional area of a micro channel 200 in a direction in which minerals flow.

The first body 120a' may be in a T shape where a second direction pipe may be formed at a side of a first direction pipe channel such that the second direction pipe may be perpendicular to the first direction pipe channel.

The connection pipe 120' may include a second body 120b' that forms the second pipe 122. The second body 120b' may be coupled to the protrusion of the first body 120a'. The second body 120b' may be provided with a micro channel 200, into which minerals may be supplied from the second channel 110. In addition, the second body 120b' may be provided with a protrusion 210 and an opening and closing member 220 formed on the side of a discharge end 200b of the micro channel 200.

A side of the second body 120b' that the discharge end 200b of the micro channel 200 may be formed may be directly connected to the protrusion of the first body 120a'. In addition, the outer circumferential surfaces of the first body 120a' and the second body 120b' that contact may be welded so as to connect the first body 120a' and the second body 120b' and to prevent water leakage.

That is, the second body 120b' may not include a connection structure configured to be inserted into a pipe channel of the protrusion, and only the micro channel 200, the protrusion 210, and the opening and closing member 220 may be formed in the second body 120b'. Thus, the structure of the second body 120b' may be further simplified.

A drinking water supply device 1 according to an embodiment may further include a controller 180 configured to control the first valve 74, the flow rate sensor 75, the second valve 130, the pump 160, and the pressure sensor 170. The controller 180 may be electrically connected to the first valve 74, the flow rate sensor 75, the second valve 130, the pump 160, and the pressure sensor 170. While the second valve 130 is closed, the controller 180 may selectively control the pump 160 so the pressure in the second channel 110 may be maintained within a predetermined range of pressure.

Figure 10A:
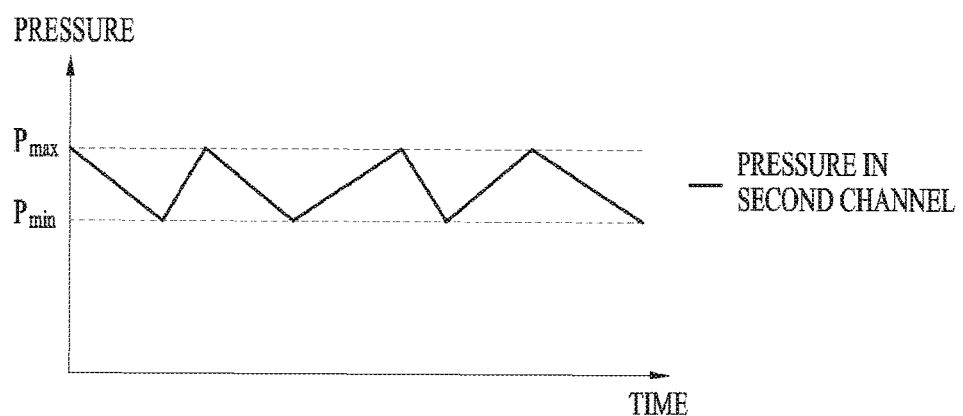
FIG. 10A is a graph showing the control of pressure in a second channel in a quantitative control mode.

As shown in FIG. 10A, the controller 180 may selectively control the pump 160 so the pressure in the second channel 110 may be maintained between a predetermined upper limit pressure value $P_{max}$ and a predetermined lower limit pressure value $P_{min}$. The pressure in the second channel 110 may be reduced over time.

The controller 180 may control the pump 160 to repeatedly operate and stop based on the pressure in the second channel 110 sensed by the pressure sensor 170 so the pressure in the second channel 110 may be within a predetermined range of pressure or between the upper limit pressure value $P_{max}$ and the lower limit pressure value $P_{min}$. When the second valve 130 is closed, the pressure in the second channel 110 may be maintained within the predetermined range of pressure.

The second channel 110, the connection pipe 120, the second valve 130, the mineral container 140, the container fastening unit 150, and the pump 160 may constitute a mineral water supply module 100 that may be separately coupled to the drinking water supply device 1.

According to an embodiment disclosed herein, a drinking water supply device 1 may operate in a quantitative control mode or in a real time control mode based on a user's selection or command.

When the quantitative control mode is selected by the user and input to the controller 180, the controller 180 may control the first valve 74 to open until a predetermined flow rate may be sensed by the flow rate sensor 75.

The controller 180 may control the second valve 130 to open for a predetermined amount of time so condensed minerals may be supplied to drinking water within a time period during which the first valve 74 is open.

As the pressure in the second channel 110 may be maintained within a predetermined range of pressure, a predetermined amount of condensed minerals may be supplied to drinking water or to the connection pipe while the second valve 130 is open for the predetermined amount of time.

That is, as the pressure in the second channel 110 is maintained between the predetermined upper limit pressure value $P_{max}$ and the predetermined lower limit pressure value $P_{min}$, as shown in FIG. 10A, a predetermined amount of condensed minerals may be supplied to drinking water or to the connection pipe while the second valve 130 is open for the predetermined amount of time.

The pump 160 may be controlled by the controller 180 so the pressure in the second channel 110 may be maintained within the predetermined range of pressure while the second valve 130 is closed.

After the second valve 130 is closed, the controller 180 may control the pump 160 based on the pressure in the second channel 110 sensed by the pressure sensor 170 so the pressure in the second channel 110 may be maintained within the predetermined range of pressure.

For example, when the second valve 130 is opened for a predetermined time and then closed, the pressure in the second channel 110 may be lower than a predetermined level of pressure. The controller 180 may control the pump 160 to increase the pressure in the second channel 110 to be within the predetermined range of pressure.

When the pressure in the second channel 110 is maintained within the predetermined range of pressure, it may be possible to accurately control the amount of condensed minerals supplied to drinking water. The pressure in the second channel 110 may be controlled based on taste of mineral water obtained from mixing condensed minerals with drinking water.

Selecting or inputting a real time control mode with the controller 180 may mean that a user may receive drinking water from a drinking water supply device in real time without inputting a command through the quantitative controller 5.

When the real time control mode is selected or input to the controller 180, the controller 180 may control at least one of the pump 160 and the second valve 130 by comparing a flow rate m per unit time sensed by the flow rate sensor 75 and a predetermined flow rate range $M_1$ to $M_2$ per unit time. That is, the controller 180 may determine whether or not the flow rate m per unit time sensed by the flow rate sensor 75 may be within the predetermined flow rate range $M_1$ to $M_2$ per unit time.

The flow rate m per unit time may be sensed by the flow rate sensor 75 simultaneously with when drinking water begins discharging in the real time control mode. The determination of the flow rate m per unit time by the controller 180 may be based on the potential for the amount of raw water supplied through the water tap 10 to vary depending upon region or time zone.

For example, when the flow rate m per unit time sensed by the flow rate sensor 75 is within the predetermined flow rate range $M_1$ to $M_2$ per unit time ($M_1 \leq m \leq M_2$), the controller 180 may control the second valve 130 to open for a predetermined first time $T_{s1}$.

The first time $T_{s1}$ may be set based on a total flow rate sensed by the flow rate sensor 75 while the drinking water supply device 1 discharges drinking water. For example, the first time $T_{s1}$ may be set so the higher the total flow rate sensed by the flow rate sensor 75 during the discharge of drinking water, the longer the first time $T_{s1}$ during which the second valve 130 may be open.

That is, the first time $T_{s1}$ may be predetermined or set based on the amount of condensed minerals to be supplied from a flow rate of drinking water. In addition, the first time Ts1 may be predetermined or set based on experiments.

As the pressure in the second channel 110 may be controlled in real time so the pressure in the second channel 110 may be within the predetermined range of pressure, or between the upper limit pressure value $P_{max}$ and the lower limit pressure value $P_{min}$, the first time $T_{s1}$ during which the second valve 130 is open may be changed based on the total flow rate of drinking water so an appropriate amount of condensed minerals may be supplied to the drinking water based on the total flow rate of the drinking water. The first time $T_{s1}$ may be a value predetermined through experimentation. In addition, the first time $T_{s1}$ may be prestored in a storage medium, for example, a memory that may be connected to the controller 180.

When the flow rate m per unit time sensed by the flow rate sensor 75 is within the predetermined flow rate range $M_1$ to $M_2$ per unit time, $M_1 \leq m \leq M_2$, the controller 180 may control the second valve 130 to open for the predetermined first time Ts1 so a predetermined amount of condensed minerals may be supplied to drinking water based on the amount of the drinking water.

Upon determining that the flow rate m per unit time sensed by the flow rate sensor 75 is not within the predetermined flow rate range $M_1$ to $M_2$ per unit time, the controller 180 may determine whether the flow rate m per unit time sensed by the flow rate sensor 75 is greater or less than a predetermined flow rate range per unit time.

For example, the controller 180 may determine whether the flow rate m per unit time sensed by the flow rate sensor 75 may be less than a lower limit value $M_1$ of flow rate per unit time or greater than an upper limit value $M_2$ of flow rate per unit time.

Upon determining that the flow rate m per unit time sensed by the flow rate sensor 75 is greater than the predetermined flow rate M1 to M2 per unit time, the controller 180 may control the pump 160 to increase discharge pressure so the pressure in the second channel 110 may be maintained within a range of pressure higher than the predetermined range of pressure.

That is, when the flow rate m per unit time sensed by the flow rate sensor 75 is greater than the predetermined flow rate M1 to M2 per unit time, the discharge pressure of the pump 160 may be increased so the pressure in the second channel 110 may be maintained within a range of pressure higher than the predetermined range of pressure.

When the flow rate m per unit time sensed by the flow rate sensor 75 is greater than the predetermined flow rate M1 to M2 per unit time, it may be possible to increase the amount of condensed minerals that are supplied into drinking water due to the increase of pressure in the second channel 110.

A range of pressure higher than the predetermined range of pressure may be values predetermined through experimentation based on the difference between the flow rate m per unit time sensed by the flow rate sensor 75 and the predetermined flow rate M1 to M2 per unit time. In addition, a range of pressure higher than the predetermined range of pressure may be prestored in a storage medium, for example, a memory that may be connected to the controller 180.

Figure 10B:
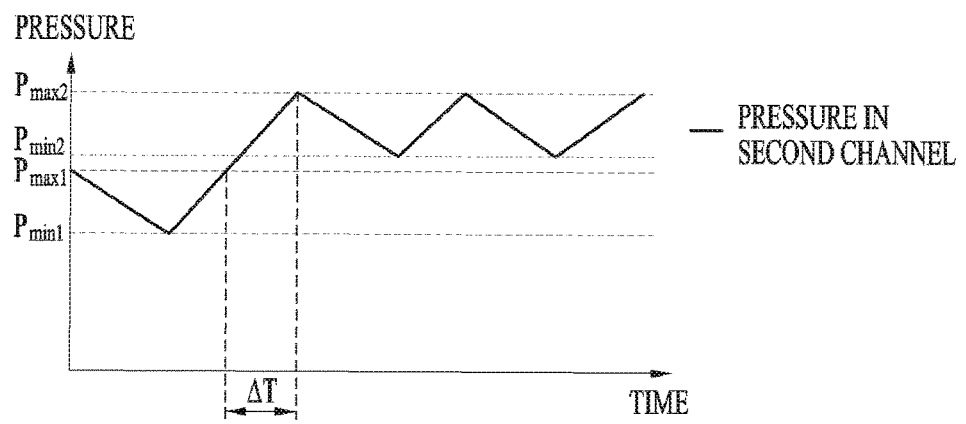
FIG. 10B is a graph showing the control of pressure in a second channel in a real time control mode.

For example, referring to FIG. 10B, during a period ΔT in which the flow rate m per unit time sensed by the flow rate sensor 75 is greater than the predetermined flow rate $M_1$ to $M_2$ per unit time, the pump 160 may be controlled by the controller 180 so the pressure in the second channel 110 may be increased and maintained within a range of pressure higher than the predetermined range of pressure.

That is, in the period ΔT, during which the flow rate m per unit time sensed by the flow rate sensor 75 is greater than the predetermined flow rate $M_1$ to $M_2$ per unit time, the pressure in the second channel 110 may be within a range of pressure higher than the predetermined range of pressure.

When the flow rate m per unit time sensed by the flow rate sensor 75 remains greater than the predetermined flow rate M1 to M2 per unit time, the pump 160 may be controlled by the controller 180 so the pressure in the second channel 110 may be maintained within a range of pressure higher than the predetermined range of pressure.

The pressure in the second channel 110 may be maintained between an upper limit pressure value $P_{max2}$, which is higher than a predetermined upper limit pressure value $P_{max1}$, and an predetermined lower limit pressure value $P_{min2}$, which is higher than a predetermined lower limit pressure value $P_{min1}$, based on the increase in the flow rate m per unit time sensed by the flow rate sensor 75.

The predetermined upper limit pressure value $P_{max1}$ and the predetermined lower limit pressure value $P_{min1}$ may be equal to the upper limit pressure value $P_{max}$ and the lower limit pressure value $P_{min}$, respectively.

Upon determining that the flow rate m per unit time sensed by the flow rate sensor 75 is less than the predetermined flow rate $M_1$ to $M_2$ per unit time, the controller 180 may control the second valve 130 to open for a predetermined second time $T_{s2}$, which may be shorter than the predetermined first time $T_{s1}$.

That is, when the flow rate m per unit time sensed by the flow rate sensor 75 is less than the predetermined flow rate $M_1$ to $M_2$ per unit time, the controller 180 may control the second valve 130 to open for a predetermined second time $T_{s2}$ shorter than the predetermined first time Ts1 to decrease the amount of condensed minerals supplied into drinking water.

The second time $T_{s2}$ may be a value determined through experimentation based on the difference between the predetermined flow rate $M_1$ to $M_2$ per unit time and the flow rate m per unit time sensed by the flow rate sensor 75. In addition, the second time $T_{s2}$ may be prestored in a storage medium, for example, a memory that may be connected to the controller 180.

A method of increasing the amount of condensed minerals supplied into drinking water when the flow rate m per unit time sensed by the flow rate sensor 75 is greater than the predetermined flow rate $M_1$ to $M_2$ per unit time may be different from a method of decreasing the amount of condensed minerals supplied into drinking water when the flow rate m per unit time sensed by the flow rate sensor 75 is less than the predetermined flow rate $M_1$ to $M_2$ per unit time.

That is, to increase the amount of condensed minerals supplied into drinking water based on the flow rate m per unit time sensed by the flow rate sensor 75, the discharge pressure of the pump 160 may be increased so the pressure in the second channel 110 may be higher than the predetermined range of pressure.

To decrease the amount of condensed minerals supplied into drinking water based on the flow rate m per unit time sensed by the flow rate sensor 75, the second valve 130 may be controlled to open for the predetermined second time $T_{s2}$ which may be shorter than the predetermined first time $T_{s1}$. That is, to decrease the amount of condensed minerals supplied into drinking water, the opening time of the second valve 130 may be reduced without reducing the pressure in the second channel 110.

If no additional pressure reduction channel or construction or component may be provided to reduce the pressure in the second channel 110, the opening time of the second valve 130 may be controlled to be shorter than the predetermined time to mix a relatively small amount of condensed minerals with drinking water or to supply a relatively small amount of condensed minerals to drinking water based on the flow rate of the drinking water per unit time. That is, the drinking water supply device 1 according to the embodiment disclosed herein may not need any additional construction or component to reduce the pressure in the second channel 110.

Figure 11:
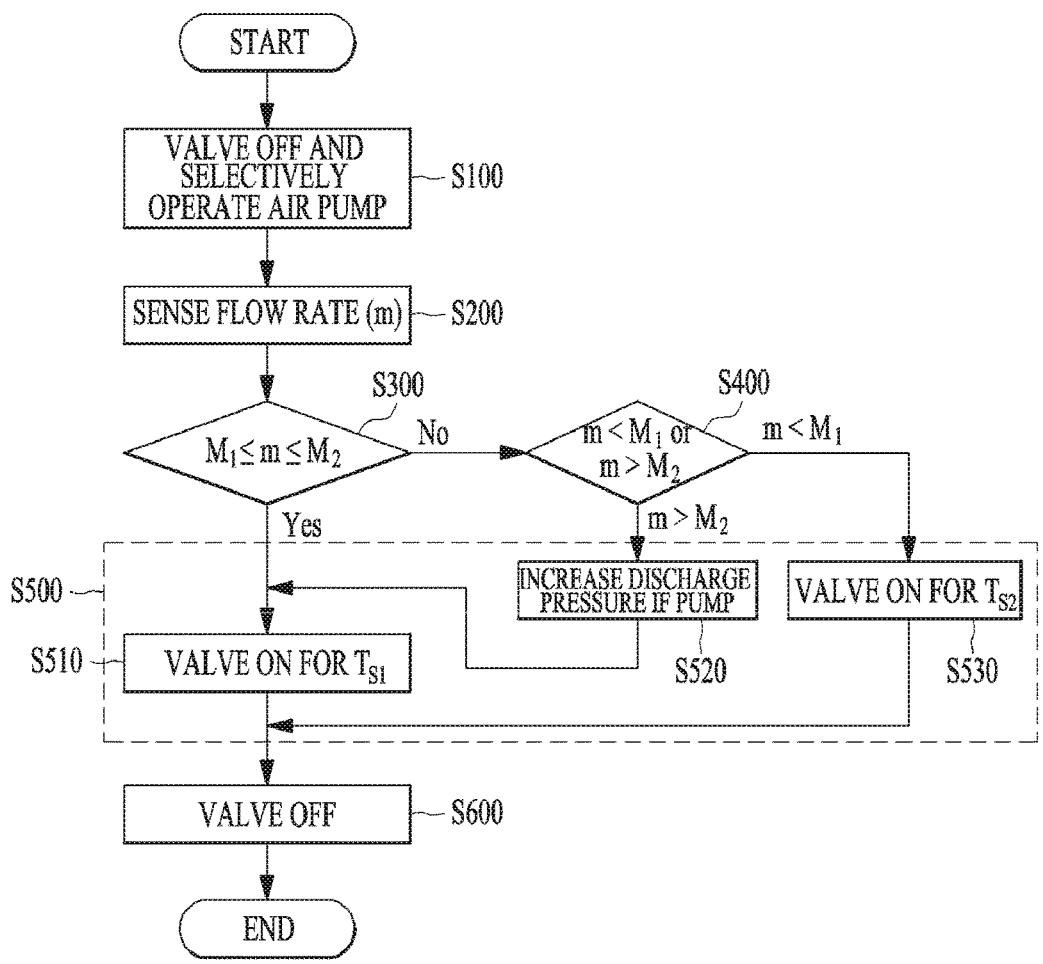
FIG. 11 is a flowchart showing a method of controlling a drinking water supply device according to an embodiment.

FIG. 11 is a flowchart of a method of controlling a drinking water supply device according to an embodiment. FIGS. 1 to 4 are equally applicable to the method of controlling the drinking water supply device.

Referring to FIG. 11 together with FIG. 1, the method of controlling the drinking water supply device according to the embodiment may be a method of controlling a drinking water supply device 1 including a first channel 71 configured to channel drinking water, the first channel 71 provided with a flow rate sensor 75, a second channel 110 configured to supply minerals to the first channel 71, the second channel 110 provided with a pressure sensor 170 and a valve or a second valve 130, a mineral container 140 connected to the second channel 110, an air pump 160 configured to pressurize an interior of the mineral container 140, and a controller configured to control the flow rate sensor 75, the second valve 130, and the air pump 160.

The method of controlling the drinking water supply device may include an air pump operation step S100 of selectively operating the air pump 160 based on the value of pressure sensed by the pressure sensor 170 so the pressure in the second channel 110 may be maintained within a predetermined range of pressure when the second valve 130 may be closed, for example, when minerals may not be supplied.

When condensed minerals are not supplied to drinking water, the pressure in the second channel 110 may be maintained at a predetermined pressure, and a predetermined amount of condensed minerals may be supplied to drinking water for a time period during which the second valve 130 is opened.

The method of controlling the drinking water supply device may further include a flow rate sensing step S200 of sensing a flow rate of drinking water m per unit time through the flow rate sensor 75, a first flow rate determination step S300 of determining whether the sensed flow rate m per unit time may be within a predetermined flow rate range $M_1$ to $M_2$ per unit time, a mineral supply step S500 of selectively controlling at least one of a discharge pressure of the air pump 160 and an opening time of the valve 130 via the controller 180 based on a determination at the first flow rate determination step S300, and a valve OFF step S600 of closing the valve 130 after a predetermined time passes.

At the flow rate sensing step S200, the flow rate of drinking water per unit time flowing in the first channel 71 may be sensed by the flow rate sensor 75. The flow rate sensor 75 may sense the flow rate of drinking water per unit time in real time and may transmit the sensed flow rate of drinking water per unit time to the controller 180.

At the first flow rate determination step S300, the controller 180 may determine whether or not the flow rate of drinking water per unit time, sensed at the flow rate sensing step S200 may be within the predetermined flow rate range $M_1$ to $M_2$ per unit time.

At the mineral supply step S500, the controller 180 may selectively control at least one of the discharge pressure of the air pump 160 and the opening time of the valve 130 to supply an amount of condensed minerals to the drinking water based on the determination at the first flow rate determination step S300.

For example, to supply a larger amount of condensed minerals than a predetermined amount of condensed minerals to the drinking water, the air pump 160 may be controlled by the controller 180 so the discharge pressure of the air pump 160 may be higher than a predetermined discharge pressure.

The pressure in the second channel 110 may be increased with the increase in discharge pressure of the air pump 160. Thus, the amount of condensed minerals supplied to drinking water may be greater than the predetermined amount of condensed minerals.

For example, when it is determined at the first flow rate determination step S300 that the sensed flow rate m per unit time may be within the predetermined flow rate range $M_1$ to $M_2$ per unit time, at the mineral supply step S500 the controller 180 may control the second valve 130 to open for a predetermined first time $T_{s1}$. That is, the mineral supply step S500 may include a step S510 of opening the second valve 130 for a predetermined first time $T_{s1}$.

The method of controlling the drinking water supply device may further include a second flow rate determination step S400 of determining whether the flow rate m of drinking water per unit time sensed by the flow rate sensor 75 is greater or less than the predetermined flow rate range $M_1$ to $M_2$ per unit time.

For example, when it is determined at the first flow rate determination step S300 that the sensed flow rate m per unit time deviates from the predetermined flow rate range $M_1$ to $M_2$ per unit time, it may be determined at the second flow rate determination step S400 whether the sensed flow rate m per unit time is greater or less than the predetermined flow rate range $M_1$ to $M_2$ per unit time.

When it is determined at the second flow rate determination step S400 that the sensed flow rate m per unit time is greater than the predetermined flow rate $M_1$ to $M_2$ per unit time, the controller 180 may control the air pump 160 so the discharge pressure of the air pump 160 may be increased, and the pressure in the second channel 110 may be maintained within a range of pressure that is higher than the predetermined range of pressure.

That is, the mineral supply step S500 may include a discharge pressure increasing step S520 of controlling the air pump 160 via the controller 180 so the discharge pressure of the air pump 160 may be increased.

When it is determined at the second flow rate determination step S400 that the sensed flow rate m per unit time is greater than the upper limit value $M_2$ of the predetermined flow rate $M_1$ to $M_2$ per unit time, at the discharge pressure increasing step S520, the discharge pressure of the air pump 160 may be increased by the controller 180 so the pressure in the second channel 110 may be maintained within a range of pressure higher than the predetermined range of pressure.

For example, as shown in FIG. 10B, the discharge pressure of the air pump 160 may be increased so the pressure in the second channel 110 may be maintained within the range of pressure $P_{min2}$ to $P_{max2}$, which is higher than the predetermined range of pressure $P_{min1}$ to $Pm_{ax1}$. Here, the difference between $P_{min1}$ and $P_{max1}$ may be equal to the difference between $P_{min2}$ and $P_{max2}$.

In addition, as an opening time of the second valve 130 provided in the second channel 110 is preset or predetermined, the amount of minerals supplied to drinking water flowing in the first channel 71 through the second channel 110 may be increased as the pressure in the second channel 110 increases.

When it is determined at the second flow rate determination step S400 that the sensed flow rate m per unit time is less than the predetermined flow rate $M_1$ to $M_2$ per unit time, the controller 180 may control the second valve 130 to open for a second time $T_{s2}$ shorter than the predetermined first time $T_{s2}$.

When the flow rate m of drinking water per unit time is less than the lower limit value M2 of the predetermined flow rate M1 to M2 per unit time, the controller 180 may reduce the opening time of the second valve 130 so the amount of condensed minerals supplied to drinking water is less than the predetermined amount of condensed minerals.

The mineral supply step S500 may include a step S530 of opening the second valve 130 for a predetermined second time $T_{s2}$ shorter than the predetermined first time $T_{s1}$ via the controller 180. That is, when the flow rate m of drinking water per unit time is less than the lower limit value $M_2$ of the predetermined flow rate $M_1$ to $M_2$ per unit time, the opening time of the second valve 130 may be reduced to the predetermined second time $T_{s2}$ when the pressure in the second channel 110 is maintained at the predetermined pressure.

Thus, the opening time of the second valve 130 may become relatively short, even when the pressure in the second channel 110 is maintained at the predetermined pressure, so that the amount of condensed minerals supplied to drinking water flowing in the first channel 71 may be reduced.

Increasing the amount of minerals supplied based on the flow rate m of drinking water per unit time may be achieved by increasing the pressure in the second channel 110 according to an increase in the discharge pressure of the air pump 160.

Decreasing the amount of minerals supplied based on the flow rate m of drinking water per unit time may be achieved by adjusting the opening time or the reduction of the opening time of the second valve 130 provided in the second channel 110.

That is, according to the embodiment disclosed herein, the opening time of the second valve 130 may be controlled to supply a smaller amount of condensed minerals than the predetermined amount of condensed minerals. Thus, it may not necessary to reduce the pressure in the second channel 110 to supply a smaller amount of condensed minerals than the predetermined amount of condensed minerals, and an additional construction or component to reduce the pressure in the second channel 110 may not be needed.

It may be possible to provide a drinking water supply device capable of maintaining the pressure in a second channel within a predetermined range of pressure, thus maintaining the amount of minerals supplied to a predetermined amount of drinking water within a predetermined range.

According to an embodiment disclosed herein, a drinking water supply device capable of varying the amount of minerals supplied to drinking water based on the flow rate of the drinking water may be provided.

A drinking water supply device capable of preventing condensed minerals contained in a mineral container from being contaminated by contaminants contained in external air when the external air is supplied into the mineral container may also be provided.

A drinking water supply device capable of preventing condensed minerals contained in a mineral container from flowing backward to an air pump connected to the mineral container may be provided.

According to an embodiment, a mineral water supply module may provide mineral water containing minerals within a predetermined range of concentration.

According to an embodiment, a mineral water supply module may prevent the diffusion of minerals remaining in a second channel when clean water is discharged and thus provide clean water within an allowable deviation in taste.

According to an embodiment, a mineral water supply module may alternately provide mineral water and clean water having a regular taste within an allowable deviation in taste of water.

According to an embodiment, a mineral water supply module may accelerate the mixing of minerals with clean water and thus provide mineral water having a uniform taste when the mineral water is discharged.

According to an embodiment, a mineral water supply module may provide a mineral water supply module that may have a simple structure and may be easily manufactured.

According to an embodiment, a mineral water supply module may provide a mineral water supply module having a compact structure that may be easily applicable to various drinking water supply devices.

According to embodiments disclosed herein, a drinking water supply device may be capable of maintaining the pressure in a second channel within a predetermined range of pressure, thus maintaining the amount of minerals supplied to a predetermined amount of drinking water within a predetermined range.

A drinking water supply device may be capable of varying the amount of minerals supplied to drinking water based on the flow rate of the drinking water.

A drinking water supply device may be capable of preventing condensed minerals contained in a mineral container from being contaminated by contaminants contained in external air when the external air is supplied into the mineral container.

A drinking water supply device may be capable of preventing condensed minerals contained in a mineral container from flowing backward to an air pump connected to the mineral container.

According to an embodiment, a mineral water supply module may be capable of providing mineral water, in which the deviation in concentration of minerals may be minimized or clean water having a taste that falls within an allowable deviation, and a drinking water supply device including the mineral water supply module capable of the same may be provided.

According to embodiments disclosed herein, a drinking water supply device may include a first channel configured to channel water, the first channel provided with a first valve, a flow rate sensor configured to sense the flow rate of the water, a water discharge channel connected or coupled to a rear end of the first channel, a connection pipe connecting the first channel and the water discharge channel, a second channel configured to supply minerals to the connection pipe, the second channel provided with a pressure sensor and a second valve, a mineral container configured to connect to the connection pipe via the second channel and configured to store condensed minerals, a pump configured to pressurize an interior of the mineral container to allow discharge of the condensed minerals from the mineral container, and a controller configured to control the flow rate sensor, the pressure sensor, and the first valve, wherein the controller selectively controls the pump so pressure in the second channel may be maintained within a predetermined range of pressure while the second valve is closed.

When a quantitative control mode is input to the controller, the controller may control the first valve to open until a predetermined flow rate may be sensed by the flow rate sensor and may control the second valve to open for a predetermined time so condensed minerals may be supplied to drinking water within a time period during which the first valve is open.

When a real time control mode is input to the controller, the controller may selectively control at least one of the pump and the second valve based on the result of a comparison between a flow rate per unit time sensed by the flow rate sensor and a predetermined flow rate range per unit time.

When the flow rate per unit time sensed by the flow rate sensor is within the predetermined flow rate range per unit time, the controller may control the second valve to open for a predetermined first time.

Upon determining that the flow rate per unit time sensed by the flow rate sensor is greater than the predetermined flow rate per unit time, the controller may control a discharge pressure of the pump to increase so the pressure in the second channel may be maintained within a range of pressure that may be higher than the predetermined range of pressure.

Upon determining that the flow rate per unit time sensed by the flow rate sensor is less than the predetermined flow rate per unit time, the controller may control the second valve to open for a predetermined second time, wherein the predetermined second time is shorter than the predetermined first time.

The connection pipe may be provided with a second pipe configured to reduce the supply pressure of condensed minerals supplied through the second channel.

The pressure sensor may be provided further upstream than the second valve in the second channel.

The pump may be an air pump configured to suction external air and to inject the suctioned external air into the mineral container.

The mineral container may be provided with an injection hole at a lower part through which external air may be injected into the mineral container and a discharge hole through which the condensed minerals may be discharged from the mineral container.

According to an embodiment, the drinking water supply device may further include a container fastening unit or fastener configured to fasten to the mineral container at a lower side of the mineral container.

The injection hole and the discharge hole may be provided at a lower end of the container fastening unit, the injection hole may be connected to the air pump via a third channel, and the discharge hole may be connected to the second channel.

According to embodiments disclosed herein, a method of controlling a drinking water supply device, including a first channel configured to channel water, the first channel provided with a flow rate sensor, a second channel configured to supply minerals to the first channel, the second channel provided with a pressure sensor and a valve, a mineral container configured to connect to the second channel, an air pump configured to pressurize the interior of the mineral container, and a controller configured to control the flow rate sensor, the valve, and the air pump may be provided.

The method of controlling the drinking water supply device may include sensing a flow rate of drinking water flowing in the first channel per unit time through the flow rate sensor (a flow rate sensing step), determining whether the flow rate per unit time sensed at the flow rate sensing step is within a predetermined flow rate range per unit time (a first flow rate determination step), and selectively controlling at least one of a discharge pressure of the air pump and an opening time of the valve via the controller to supply condensed minerals to drinking water in an amount based on a determination at the first flow rate determination step (a mineral supply step) of whether the flow rate per unit time sensed is within a predetermined flow rate range per unit time.

The method may further include selectively operating the air pump based on the value of pressure sensed by the pressure sensor so the pressure in the second channel may be maintained within a predetermined range of pressure when the valve is closed (an air pump operation step) before sensing the flow rate of drinking water flowing in the first channel per unit time through the flow rate sensor (the flow rate sensing step).

When it is determined at the first flow rate determination step that the sensed flow rate per unit time is within the predetermined flow rate range per unit time, at the mineral supply step, the valve may be controlled by the controller so the valve may be open for a predetermined first time.

In addition, the method may further include, when it is determined at the first flow rate determination step that the sensed flow rate per unit time deviates from the predetermined flow rate range per unit time, determining whether the sensed flow rate per unit time is greater or less than the predetermined flow rate range per unit time (a second flow rate determination step).

When it is determined at the second flow rate determination step that the sensed flow rate per unit time is greater than the predetermined flow rate per unit time, the discharge pressure of the air pump may be increased via the controller so the pressure in the second channel may be maintained within a range of pressure that is higher than the predetermined range of pressure to increase the amount of condensed minerals supplied to drinking water to be greater than a predetermined amount of condensed minerals.

In addition, when it is determined at the second flow rate determination step that the sensed flow rate per unit time is less than the predetermined flow rate per unit time, the valve may be controlled by the controller so the valve may be open for a second time to decrease the amount of condensed minerals supplied to drinking water to be less than a predetermined amount of condensed minerals, wherein the second time is shorter than the predetermined first time.

A mineral water supply module for providing mineral water to a user may include a first channel for supplying clean water, a second channel for supplying minerals, and a water discharge channel for discharging clean water or clean water containing minerals, i.e. mineral water, depending upon whether minerals are supplied.

The mineral water supply module may further include a connection pipe, which includes a first pipe connected to the first channel, a second pipe connected to the second channel, and a third pipe connected to the water discharge channel. A mixing space, in which minerals are mixed with clean water, may be formed between the first pipe and the second pipe.

The mineral water supply module may further include a micro channel provided in the second pipe in order to provide mineral water, in which the deviation in concentration of minerals is minimized, the micro channel defining a mineral supply line, through which a very small amount of minerals are supplied to the mixing space.

The micro channel may be configured to have a minimum diameter and a predetermined length at which the micro channel may be molded and machined such that the micro channel supplies a predetermined fixed amount of minerals for a predetermined time.

The mixing space may be a space in which clean water flowing in the first pipe in a first direction and minerals flowing in the second pipe in a second direction, which is different from the first direction, collide with each other such that the minerals are mixed with the clean water.

The mineral water supply module may further include an opening and closing member for selectively opening and closing the micro channel.

The opening and closing member, which is a means for fundamentally preventing the diffusion of minerals remaining in the micro channel according to concentration equilibrium when clean water is selected by a user, may be provided at the discharge end of the micro channel, through which minerals are supplied to the mixing space.

The second pipe may be provided at an end thereof, at which the discharge end of the micro channel is formed, with a protrusion for fixing the opening and closing member.

The opening and closing member may include a fixing part fixed to the protrusion, a deformable part extending from the fixing part to the discharge end of the micro channel by a predetermined length, and a deformable groove provided between the fixing part and the deformable part for allowing easy deformation of the deformable part while minimizing the deformation of the fixing part.

The opening and closing member may be made of a soft synthetic resin or a rubber material such that the opening and closing member is opened when the pressure applied by the pump is equal to or greater than a predetermined level and such that the opening and closing member is easily deformable when pressure is applied thereto.

In order to improve productivity, the connection pipe may include a first body, which integrally forms the first pipe and the third pipe, and a second body, which forms the second pipe. The first body and the second body may be coupled to each other.

The first body may include a protrusion diverging perpendicularly between the first pipe and the third pipe such that the protrusion protrudes a predetermined height.

The second body may be provided at the other side thereof, at which the micro channel is provided, with a step part having an outer diameter corresponding to the inner diameter of the protrusion. The second body may be coupled to the first body by inserting the step part into the pipe channel of the protrusion and welding the step part to the pipe channel of the protrusion.

One side of the second body, at which the discharge end of the micro channel is formed, may be directly connected to the outer circumferential surface of the protrusion, and the outer circumferential surface of the second body may be welded to the outer circumferential surface of the protrusion such that the second body is coupled to the first body.

A mineral water generation module may include a first channel for supplying clean water, a second channel for supplying minerals, and a water discharge channel for discharging clean water or clean water containing minerals, i.e. mineral water, depending upon whether minerals are supplied.

The mineral water generation module may further include a connection pipe, which includes a first pipe connected to the first channel, a second pipe connected to the second channel, and a third pipe connected to the water discharge channel. A mixing space, in which minerals are mixed with clean water, may be formed between the first pipe and the second pipe.

The mineral water generation module may further include a micro channel provided in the second pipe for selectively discharging clean water or mineral water. The micro channel may be formed in a cylindrical shape having a diameter of 0.5 mm to 1.0 mm such that a predetermined very small amount of minerals are supplied to the mixing space through the micro channel.

This application relates to U.S. application Ser. Nos. 14/963,327 and 14/963,418, both filed on Dec. 9, 2015, which are hereby incorporated by reference in their entirety. Further, one of ordinary skill in the art will recognize that features disclosed in these above-noted applications may be combined in any combination with features disclosed herein.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drinking water supply device comprising:
    a first channel configured to channel water, the first channel provided with a first valve;
    a flow rate sensor configured to sense a flow rate of the water;
    a water discharge channel connected to a rear end of the first channel;
    a connection pipe connecting the first channel and the water discharge channel;
    a second channel configured to supply minerals to the connection pipe, the second channel provided with a pressure sensor and a second valve;
    a mineral container configured to connect to the connection pipe via the second channel and configured to store condensed minerals;
    a pump configured to pressurize an interior of the mineral container to allow discharge of the condensed minerals from the mineral container; and
    a controller configured to control the flow rate sensor, the pressure sensor, and the first valve, wherein
    the controller selectively controls the pump such that pressure in the second channel is maintained within a predetermined range of pressure while the second valve is closed.

2. The drinking water supply device according to claim 1, wherein, when a quantitative control mode is input to the controller, the controller controls the first valve to open until a predetermined flow rate is sensed by the flow rate sensor, and controls the second valve to open for a predetermined time so condensed minerals are supplied to drinking water within a time period during which the first valve is open.

3. The drinking water supply device according to claim 1, wherein, when a real time control mode is input to the controller, the controller selectively controls at least one of the pump and the second valve based on a result of comparison between a flow rate per unit time sensed by the flow rate sensor and a predetermined flow rate range per unit time.

4. The drinking water supply device according to claim 3, wherein, when the flow rate per unit time sensed by the flow rate sensor is within the predetermined flow rate range per unit time, the controller controls the second valve to open for a predetermined first time.

5. The drinking water supply device according to claim 4, wherein, upon determining that the flow rate per unit time sensed by the flow rate sensor is greater than the predetermined flow rate per unit time, the controller controls a discharge pressure of the pump to increase so the pressure in the second channel is maintained within a range of pressure that is higher than the predetermined range of pressure.

6. The drinking water supply device according to claim 4, wherein upon determining that the flow rate per unit time sensed by the flow rate sensor is less than the predetermined flow rate per unit time, the controller controls the second valve to open for a predetermined second time, wherein the predetermined second time is shorter than the predetermined first time.

7. The drinking water supply device according to claim 1, wherein the connection pipe is provided with a second pipe configured to reduce a supply pressure of condensed minerals supplied through the second channel.

8. The drinking water supply device according to claim 1, wherein the pressure sensor is provided further upstream than the second valve in the second channel.

9. The drinking water supply device according to claim 1, wherein the pump is an air pump configured to suction external air and to inject the suctioned external air into the mineral container.

10. The drinking water supply device according to claim 9, wherein the mineral container is provided with an injection hole at a lower part through which external air is injected into the mineral container and a discharge hole through which the condensed minerals are discharged from the mineral container, and
  wherein the injection hole is connected to the pump through a connection line, and the discharge hole is connected to the second channel.

11. The drinking water supply device according to claim 10, further comprising:
  a container fastener configured to fasten to the mineral container at a lower side of the mineral container, wherein
  the injection hole and the discharge hole are provided at a lower end of the container fastening unit,
  the injection hole is connected to the air pump via a third channel, and
  the discharge hole is connected to the second channel.

* * * * *